United States Patent
Iida

(10) Patent No.: US 7,489,945 B2
(45) Date of Patent: Feb. 10, 2009

(54) WIRELESS COMMUNICATION AND IMAGING APPARATUS

(75) Inventor: Takayuki Iida, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 244 days.

(21) Appl. No.: 10/628,557

(22) Filed: Jul. 29, 2003

(65) Prior Publication Data

US 2004/0053637 A1  Mar. 18, 2004

(30) Foreign Application Priority Data

Jul. 29, 2002 (JP) .............................. 2002-219962
Jul. 29, 2002 (JP) .............................. 2002-219965

(51) Int. Cl.
*H04M 1/00* (2006.01)
(52) U.S. Cl. ................. 455/556.1; 455/456.1
(58) Field of Classification Search .............. 455/456.1, 455/457, 566, 406, 408, 556.1, 557; 370/348, 370/328, 252, 259
See application file for complete search history.

(56) References Cited

U.S. PATENT DOCUMENTS

| | | | |
|---|---|---|---|
| 4,903,319 A | 2/1990 | Kasai et al. | |
| 5,819,180 A * | 10/1998 | Alperovich et al. | 455/465 |
| 6,073,035 A | 6/2000 | Witter | |
| 6,148,197 A | 11/2000 | Bridges et al. | |
| 6,400,690 B1 | 6/2002 | Liu et al. | |
| 6,967,944 B2 * | 11/2005 | Choi | 370/348 |
| 7,058,358 B2 * | 6/2006 | Cannon et al. | 455/41.2 |
| 7,142,847 B2 * | 11/2006 | Umeda et al. | 455/418 |
| 2001/0022621 A1 | 9/2001 | Squibbs | |
| 2002/0040383 A1 | 4/2002 | Zehavi | |
| 2002/0183038 A1 * | 12/2002 | Comstock et al. | 455/406 |
| 2003/0120940 A1 * | 6/2003 | Vataja | 713/193 |
| 2004/0203847 A1 * | 10/2004 | Knauerhase et al. | 455/456.1 |
| 2005/0083878 A1 * | 4/2005 | Zehavi | 370/328 |
| 2006/0189349 A1 * | 8/2006 | Montulli et al. | 455/556.1 |

FOREIGN PATENT DOCUMENTS

| | | |
|---|---|---|
| EP | 1 024 626 A1 | 8/2000 |
| EP | 1 115 054 A2 | 7/2001 |
| EP | 1 189 424 A1 | 3/2002 |

(Continued)

OTHER PUBLICATIONS

EP Office Action dated Nov. 17, 2005 in EP Application No. 03 017 048.9.

(Continued)

*Primary Examiner*—Blane J Jackson
(74) *Attorney, Agent, or Firm*—Sughrue Mion, PLLC

(57) ABSTRACT

When image data obtained by an imaging apparatus such as a digital camera are sent via a wireless communication system, power consumption by a wireless communication apparatus installed in the imaging apparatus is reduced as much as possible. First communication means receives base station information from a base station in a mobile phone communication network, and judgment means judges whether or not a coverage area of the wireless communication equipment exists in a coverage area of the base station, based on the base station information. If a result of the judgment is affirmative, second communication means that carries out data communication is activated, and the image data obtained by photography are sent to the wireless communication equipment.

23 Claims, 18 Drawing Sheets

FOREIGN PATENT DOCUMENTS

| | | |
|---|---|---|
| EP | 1 298 912 A2 | 4/2003 |
| GB | 2 275 848 A | 9/1994 |
| JP | 6-233020 A | 8/1994 |
| JP | 08-008806 A | 1/1996 |
| JP | 11-186955 A | 7/1999 |
| JP | 2000-253290 A | 9/2000 |
| JP | 2001-060910 A | 3/2001 |
| JP | 2001-245358 | 9/2001 |
| JP | 2002-199121 | 7/2002 |

OTHER PUBLICATIONS

EP Office Action dated Jun. 23, 2006 issued in EP Application No. 03 017 084.9.

EP Office Action dated Aug. 7, 2006 issued in EP Application No. 05 004 683.8.

* cited by examiner

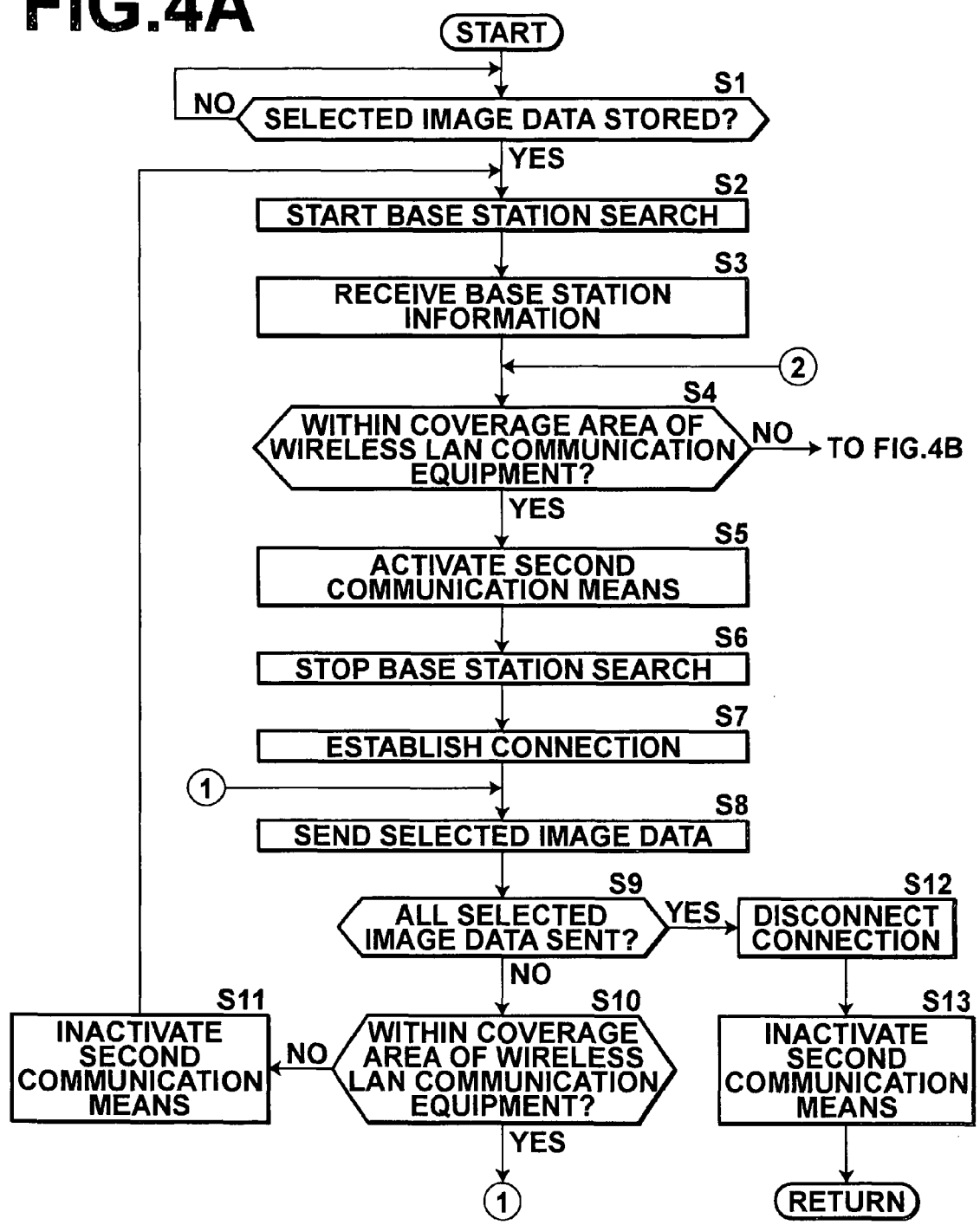

WIRELESS COMMUNICATION AND IMAGING APPARATUS

BACKGROUND OF THE INVENTION

1. Field of the Invention

The present invention relates to a wireless communication apparatus used for communication wireless with wireless communication equipment installed in a hot spot or the like, and to an imaging apparatus comprising the wireless communication apparatus.

The present invention also relates to an imaging apparatus such as a digital camera comprising wireless communication means used for carrying out communication wireless with wireless communication equipment installed in a hot spot or the like.

2. Description of the Related Art

A digital camera having a communication function for sending and receiving image data obtained by photography has been proposed. Furthermore, mobile phones with built in cameras having photography means for obtaining image data by photography (such as Japanese Unexamined Patent Publication Nos. Hei 6(1994)-233020 and 2000-253290) are also spreading. In such a digital camera and a mobile phone with built in camera (hereinafter referred to as a mobile terminal with built in camera), image data obtained by photography are temporarily stored in an internal memory to be displayed on a liquid crystal display monitor of the mobile terminal with built in camera, and to be sent to friends or the like as an attachment to an E-mail message. The image data can also be sent to an image server that stores and manages the image data so that the image data can be viewed by access to the image server from a personal computer and can be used for generating a photograph album or for carrying out desired image processing thereon. A printing order regarding the image data can also be placed with a laboratory that is connected to the image server.

Fuji Photo Film Co., Ltd. has also proposed a method of sending image data via a wireless from an imaging apparatus such as a mobile terminal with built in camera (Japanese Patent Application No. 2002-79345). Since a wireless has a much higher speed data transfer rate than an existing mobile phone communication network and has a fixed communication charge, a wireless can be a preferable communication infrastructure for sending data having a comparatively large size, such as image data. Especially, if an imaging apparatus detects hot spots, which are increasing recently in number, and sends image data stored therein to a laboratory or the like via a hot spot once an owner of the imaging apparatus (that is, a photographer) moves to a coverage area of the hot spot, the photographer can place a printing order or the like regarding the image data without carrying out a troublesome operation therefor.

In order to send image data via a wireless communication means from a hot spot, it is necessary for a wireless communication apparatus installed in an imaging apparatus to be activated continuously. Since a photographer carries the imaging apparatus, components thereof are designed to consume as little power as possible. However, if the wireless communication apparatus is always operating, the power to be consumed thereby becomes large, which may lead to a dead battery at the time a photographer wishes to perform photography.

SUMMARY OF THE INVENTION

The present invention has been conceived based on consideration of the above circumstances. An object of the present invention is therefore to make the amount of power consumed by a wireless communication apparatus and an imaging apparatus as little as possible.

A wireless communication apparatus of the present invention is a wireless communication apparatus comprising wireless communication means for carrying out data communication with wireless communication, and the wireless communication apparatus comprises:

judgment means for making a judgment as to whether or not the wireless communication means is within a coverage area of the wireless communication equipment; and operation control means for activating the wireless communication means only in the case where a result of the judgment by the judgment means is affirmative.

The wireless communication means such as a wireless LAN communication equipment carries out data communication via the wireless LAN, and has a data transfer rate of up to 8~11 MB per second or more. A communication charge therefor is assumed to be fixed.

The wireless LAN communication equipment is manufactured according to an IEEE (Institute of Electrical and Electronic Engineers) standard, for example. More specifically, the wireless LAN communication equipment preferably supports a standard such as IEEE 802.11a and IEEE 802.11b. The standard IEEE 802.11b is a mainstream standard using a 2.4 GHz spectrum and having a data transfer rate of up to 11 Mbps. The standard IEEE 802.11a uses a 5.0 GHz spectrum and has a data transfer rate of up to 54 Mbps. A standard IEEE 802.11 g using a 2.4 GHZ spectrum and having a data transfer rate of up to 54 Mbps has also been proposed.

The wireless communication equipment is preferably installed in a busy place such as a railroad station, a bus stop, a municipal office, a bank, a convenience store, a fast food restaurant, and a downtown area, or in an Internet café, for example. It is preferable for the wireless communication equipment to enable communication with the imaging apparatus while the imaging apparatus is moving, by using a roaming function.

The wireless communication apparatus of the present invention may further comprise lighting means whose state of lighting changes in accordance with a state of communication between the wireless communication means and the wireless communication equipment.

The lighting means may be an LED or the like that is turned on and off, flashes, and changes a color thereof, in accordance with the state of communication between the wireless communication means and the wireless communication equipment.

In the wireless communication apparatus of the present invention, the judgment means may further comprise:

mobile phone communication means for carrying out data communication via a mobile phone communication network. In this case, the mobile phone communication means receives base station information representing a base station of the mobile phone communication network that carries out the data communication with the mobile phone communication means and the judgment means judges whether or not the wireless communication means is within the coverage area of the wireless communication equipment by judging whether or not the base station represented by the base station information is a base station whose coverage area includes the coverage area of the wireless communication equipment.

Furthermore, in the wireless communication apparatus of the present invention, the judgment means may further comprise:

mobile phone communication means for carrying out data communication via a mobile phone communication network. In this case, the mobile phone communication means receives base station information representing a base station of the mobile phone communication network that carries out the data communication with the mobile phone communication means, and the judgment means judges whether or not the wireless communication means is within the coverage area of the wireless communication equipment by judging whether or not the base station represented by the base station information is a base station whose coverage area includes the coverage area of the wireless communication equipment of a specific characteristic.

The wireless communication equipment of a specific characteristic refers to wireless communication equipment via which a user of the wireless communication apparatus wishes to communicate, such as wireless communication equipment installed by a wireless service provider of the user.

In the wireless communication apparatus of the present invention, the judgment means may further comprise:

GPS reception means for receiving GPS information from GPS satellites so that the judgment means can judge whether or not the wireless communication means is within the coverage area of the wireless communication equipment, based on the GPS information.

In the wireless communication apparatus of the present invention, the judgment means may further comprise:

GPS reception means for receiving GPS information from GPS satellites so that the judgment means can judge whether or not the wireless communication means is within the coverage area of the wireless communication equipment of a specific characteristic, based on the GPS information.

A first imaging apparatus of the present invention comprises:

the wireless communication apparatus of the present invention;

image capturing means for obtaining image data;

authentication information storage means for storing authentication information that is necessary for the data communication with the wireless communication equipment;

image storage means for storing the image data obtained by the imaging means; and control means for causing the judgment means to judge whether or not the wireless communication means is within the coverage area of the wireless communication equipment in the case where the image data are stored in the image storage means, and for controlling the wireless communication means so as to send the authentication information stored in the authentication information storage means to the wireless communication equipment by carrying out the data communication with the wireless communication equipment when the operation control means activates the wireless communication means, and so as to send the image data in the image storage means to the wireless communication equipment after the wireless communication equipment authenticates the imaging apparatus according to the authentication information.

In this case, the control means may prohibit roaming in the case where the wireless communication means has been moved to a coverage area of other wireless communication equipment that is not authenticated by the authentication information but enables roaming with the wireless communication equipment that is authenticated by the authentication information, during the data communication with the wireless communication equipment that is authenticated.

In this case, the operation control means may stop the operation of the wireless communication means after the image data that were stored in the image storage means have been sent.

The authentication information refers to ESS-ID, for example. ESS-ID is the ID adopted by the international wireless standard IEEE 802.11, and is necessary for establishing a connection to a fixed communication partner. The communication means of the wireless communication apparatus and the wireless communication equipment have the same ESS-ID. ESS-ID is case sensitive, and comprises 32 1-byte characters or less. More specifically, a MAC address (Media Access Control address) can be used as the ESS-ID.

It is preferable for the data communication with the wireless communication equipment to adopt WEP (Wired Equivalent Privacy). WEP is used to improve security by setting an encryption key to a wireless packet. If WEP is adopted, communication becomes possible only in the case where the WEP set by the wireless communication apparatus agrees with the WEP set by the wireless communication equipment.

According to the wireless communication apparatus of the present invention, the judgment means judges whether or not the wireless communication means is within the coverage area of the wireless communication equipment. The wireless communication means is driven by the operation control means only in the case where the judgment result is affirmative. Therefore, it becomes unnecessary for the wireless communication means to be operating continuously. In this manner, power consumption by the wireless communication means can be reduced.

If the wireless communication apparatus of the present invention comprises the lighting means, the lighting means changes how it emits light according to the communication state between the wireless communication means and the wireless communication equipment. Therefore, by observing how the lighting means emits light, the communication state between the wireless communication means and the wireless communication equipment can be easily understood.

If the judgment means comprises the mobile phone communication means, the mobile phone communication means receives the base station information representing the base station in the mobile phone communication network that carries out the data communication with the mobile phone communication means via the mobile phone communication network. Whether or not the base station represented by the base station information is the base station whose coverage area includes the coverage area of the wireless communication equipment is then judged. If the result is affirmative, the wireless communication means is activated by the operation control means. The mobile phone communication means that carries out the data communication via the mobile phone communication network is used for searching for the coverage area of the base station. However, the mobile phone communication means consumes extremely little power. Therefore, whether or not the wireless communication means is within the coverage area of the wireless communication equipment can be judged with comparatively low power consumption.

If the judgment means comprises the mobile phone communication means, the mobile phone communication means receives the base station information representing the base station in the mobile phone communication network that carries out the data communication with the mobile phone communication means via the mobile phone communication network. Whether or not the base station represented by the base station information is the base station whose coverage area includes the coverage area of the wireless communication equipment of the specific characteristic is then judged. If the result is affirmative, the wireless communication means is activated by the operation control means. The mobile phone communication means that carries out the data communication via the mobile phone communication network is always searching for the coverage area of the base station. However, the mobile phone communication means consumes extremely little power. Therefore, whether or not the wireless communication means is within the coverage area of the wireless communication equipment of the specific characteristic can be judged with comparatively low power consumption, and the communication can be carried out between the wireless communication equipment of the specific characteristic and the wireless communication means.

If the judgment means comprises the GPS means, the GPS means receives the GPS information from GPS satellites, and whether or not the wireless communication means is within the coverage area of the wireless communication equipment is judged based on the GPS information. If the judgment result is affirmative, the operation control means activates the wireless communication means. Since power consumption by the GPS means is less than the wireless communication means although the GPS means is always receiving the GPS information, whether or not the wireless communication means is within the coverage area of the wireless communication equipment can be judged with comparatively little power consumption.

If the judgment means comprises the GPS means, the GPS means receives the GPS information from GPS satellites, and whether or not the wireless communication means is within the coverage area of the wireless communication equipment of the specific characteristic is judged based on the GPS information. If the judgment result is affirmative, the operation control means activates the wireless communication means. Since power consumption by the GPS means is less than the wireless communication means although the GPS means is always receiving the GPS information, whether or not the wireless communication means is within the coverage area of the wireless communication equipment of the specific characteristic can be judged with comparatively low power consumption, and the communication can be carried out between the wireless communication equipment of the specific characteristic and the wireless communication means.

According to the first imaging apparatus of the present invention, the image data obtained by the imaging means are stored in the image storage means. In the case where the image data are stored in the image storage means, the judgment means judges whether or not the wireless communication means is within the coverage area of the wireless communication equipment. If the judgment result is affirmative, the operation control means activates the wireless communication means, and the authentication information stored in the authentication information storage means is sent to the wireless communication equipment. If the wireless communication equipment authenticates the imaging apparatus having the wireless communication means, the image data stored in the image storage means are sent to the wireless communication equipment. Therefore, according to the first imaging apparatus of the present invention, the image data are sent to the wireless communication equipment via the wireless communication means that has a much higher data transfer rate.

For example, if the wireless communication means such as a wireless LAN has the data transfer rate of 11 Mbps, the time necessary for sending the image data having a 600-KB data size is only 0.4 seconds. Therefore, a user of the imaging apparatus can efficiently send the image data for storage of the image data in an image server or for generation of printed matter therefrom.

If the control means has a function of prohibiting roaming, roaming is prohibited in the case where the wireless communication means enters the coverage area of other wireless communication equipment that is not authenticated by the authentication information but enables roaming with the wireless communication equipment authenticated by the authentication information, during the communication with the authenticated wireless communication equipment. A user of the imaging apparatus of the present invention may move outside of the coverage area of the authenticated wireless communication equipment during the communication with the authenticated wireless communication equipment. In the case where a wireless service provider which is different from a wireless service provider of the user has installed wireless communication equipment outside the coverage area of the authenticated wireless communication equipment and the wireless service provider provides a roaming service with the wireless service provider of the user, the user can maintain a communicable state by roaming even if the user is outside the coverage area of the authenticated wireless communication equipment.

However, an additional charge may be necessary for roaming. Therefore, by prohibiting roaming in the above manner, the user can avoid paying the additional charge for roaming.

If the operation control means inactivates the wireless communication means after transmission of all the image data stored in the image storage means, wasteful power consumption by the wireless communication means can be prevented.

A second imaging apparatus of the present invention comprises;

image capturing means for obtaining image data;

wireless communication means for carrying out data communication with wireless communication equipment;

authentication information storage means for storing authentication information that is necessary for the data communication with the wireless communication equipment;

image storage means for storing the image data obtained by the imaging means;

instruction means for receiving a transfer instruction regarding the image data stored in the image storage means; and control means for controlling the wireless communication means so as to send the authentication information stored in the authentication information storage means to the wireless communication equipment by carrying out the data communication with the wireless communication equipment in the case where the transfer instruction is received by the instruction means in a state where the image data are stored in the image storage means and so as to send the image data stored in the image storage means to the wireless communication equipment after the wireless communication equipment authenticates the imaging apparatus according to the authentication information.

The second imaging apparatus of the present invention may further comprise:

search means for carrying out a search for pieces of the wireless communication equipment that are communicable with the wireless communication means, in response to an external instruction input;

display means for displaying a list of the pieces of the wireless communication equipment as a result of the search carried out by the search means; and selection means for selecting a desired one of the pieces of the wireless communication equipment from the result of the search. In this case, the control means controls the wireless communication means so as to send the authentication information stored in the authentication information storage means to the selected piece of the wireless communication equipment by carrying out the data communication with the selected piece of the wireless communication equipment in the case where the desired piece of the wireless communication equipment has been selected from the search result and the transfer instruction is received by the instruction means in a state where the image data are stored in the image storage means, and so as to send the image data stored in the image storage means to the selected piece of the wireless communication equipment after the selected piece of the wireless communication equipment authenticates the imaging apparatus according to the authentication information.

The search means may search for pieces of wireless communication equipment including wireless communication equipment that enables roaming with the wireless communication equipment authenticated by the authentication information, in addition to the wireless communication equipment authenticated by the authentication information. In this case, the display means may display the types of a plurality of pieces of wireless communication equipment in the case where the wireless communication means is communicable with the plurality of pieces of wireless communication equipment including the wireless communication equipment authenticated by the authentication information and/or the pieces of wireless communication equipment searched for by the search means.

The wireless communication equipment authenticated by the authentication information refers to wireless communication equipment that can be authenticated directly by the authentication information stored in the authentication information storage means, such as wireless communication equipment installed by a wireless service provider of which a user using the imaging apparatus of the present invention has direct membership.

The types refer to information that enables distinction of an installer of the wireless communication equipment, such as the wireless service provider of the user, a wireless service provider providing the roaming service with the user's service provider, or a wireless service provider other than those described above.

In the second imaging apparatus of the present invention, the display means may display a communication charge for the pieces of wireless communication equipment searched for by the search means.

In the second imaging apparatus of the present invention, the search means may further comprise mobile phone communication means for carrying out data communication via a mobile phone communication network so that the mobile phone communication means can receive base station information representing a base station of the mobile phone communication network via which the data communication with the mobile phone communication means is carried out, and the search means can search for the pieces of the wireless communication equipment that are communicable with the wireless communication means, based on the base station information.

In the second imaging apparatus of the present invention, the search means may further comprise GPS reception means for receiving GPS information from GPS satellites so that the search mean can search for the pieces of the wireless communication equipment that are communicable with the wireless communication means, based on the GPS information.

According to the second imaging apparatus of the present invention, if the user instructs image data transfer by using the instruction means in a state where the image data are stored in the image storage means, the wireless communication means carries out the data communication with the wireless communication equipment to send the authentication information stored in the authentication information storage means thereto. After the wireless communication equipment authenticates the imaging apparatus, the image data stored in the image storage means are sent to the wireless communication equipment. Therefore, the image data are transferred only in the case where the transfer instruction is input from the instruction means, and continuous operation of the wireless communication means is not necessary. In this manner, power consumption by the wireless communication means can be reduced.

A wireless communication network has a much higher data transfer rate than a mobile phone communication network. For example, in the case of a wireless having a data transfer rate of 11 Mbps, the time necessary for sending 600-KB image data is only 0.4 seconds. Therefore, the user of the imaging apparatus can efficiently send the image data and can request storage of the image data in an image server or printed matter generation from the image data.

If the imaging apparatus comprises the search means, the display means, and the selection means, the search means searches for the pieces of the wireless communication equipment that are communicable with the wireless communication means, in response to the external instruction input. The list of the pieces of the wireless communication equipment that have been found is displayed on the display means as the search result. In the case where the desired piece of the wireless communication equipment is selected from the search result and the image data transfer instruction is input from the instruction means in a state where the image data are stored in the image storage means, the data communication between the wireless communication means and the selected piece of the wireless communication equipment is carried out. The authentication information stored in the authentication information storage means is sent to the selected piece of the wireless communication equipment and the image data in the image storage means are sent to the selected piece of the wireless communication equipment after the selected piece of the wireless communication equipment authenticates the imaging apparatus. Therefore, continuous search for the pieces of the wireless communication equipment that are communicable with the wireless communication means is unnecessary, which also leads to lower power consumption by the imaging apparatus.

If the search means can search for the pieces of wireless communication equipment including the piece of wireless communication equipment that enables roaming with the wireless communication equipment authenticated by the authentication information in addition to the wireless communication equipment authenticated by the authentication information, the types of the plurality of pieces of wireless communication equipment are displayed on the display means in the case where the wireless communication means is communicable with the plurality of pieces of wireless communication equipment including the wireless communication equipment authenticated by the authentication information and/or the pieces of wireless communication equipment searched by the search means. Therefore, the user of the imaging apparatus can easily confirm the plurality of pieces of wireless communication equipment that are currently available, and can easily select the desired piece of wireless communication equipment to be used for the data communication.

If the imaging apparatus can display the charge for using the pieces of wireless communication equipment other than the wireless communication equipment of the wireless service provider of the user, the user can use this information for selecting the desired piece of wireless communication equipment to be used.

If the search means comprises the mobile phone communication means, the mobile phone communication means receives the base station information representing the base station in the mobile phone communication network that carries out data communication with the mobile phone communication means, and the search means searches for the pieces of the wireless communication equipment that is communicable with the wireless communication means, based on the base station information. The mobile phone communication means that carries out the data communication via the mobile phone communication network is used for searching for the coverage area of the base station. However, the mobile phone communication means consumes extremely little power. Furthermore, the search means carries out the search only in the case where the external instruction has been input. Therefore, whether or not the wireless communication means is within the coverage area of the wireless communication equipment can be judged with comparatively low power consumption.

If the search means comprises the GPS reception means, the GPS reception means receives the GPS information from GPS satellites, and the pieces of the wireless communication equipment that are communicable with the wireless communication means are searched for, based on the GPS information. Since power consumption by the GPS reception means is extremely little and the search means carries out the search only in the case where the external instruction is input, whether or not the wireless communication means is within the coverage area of the wireless communication equipment can be judged with comparatively low power consumption.

BRIEF DESCRIPTION OF THE DRAWINGS

FIG. 4A and FIG. 4B show a flow chart illustrating the procedures carried out at the time of sending selected image data in the first embodiment;

DESCRIPTION OF THE PREFERRED EMBODIMENTS

Figure 1:
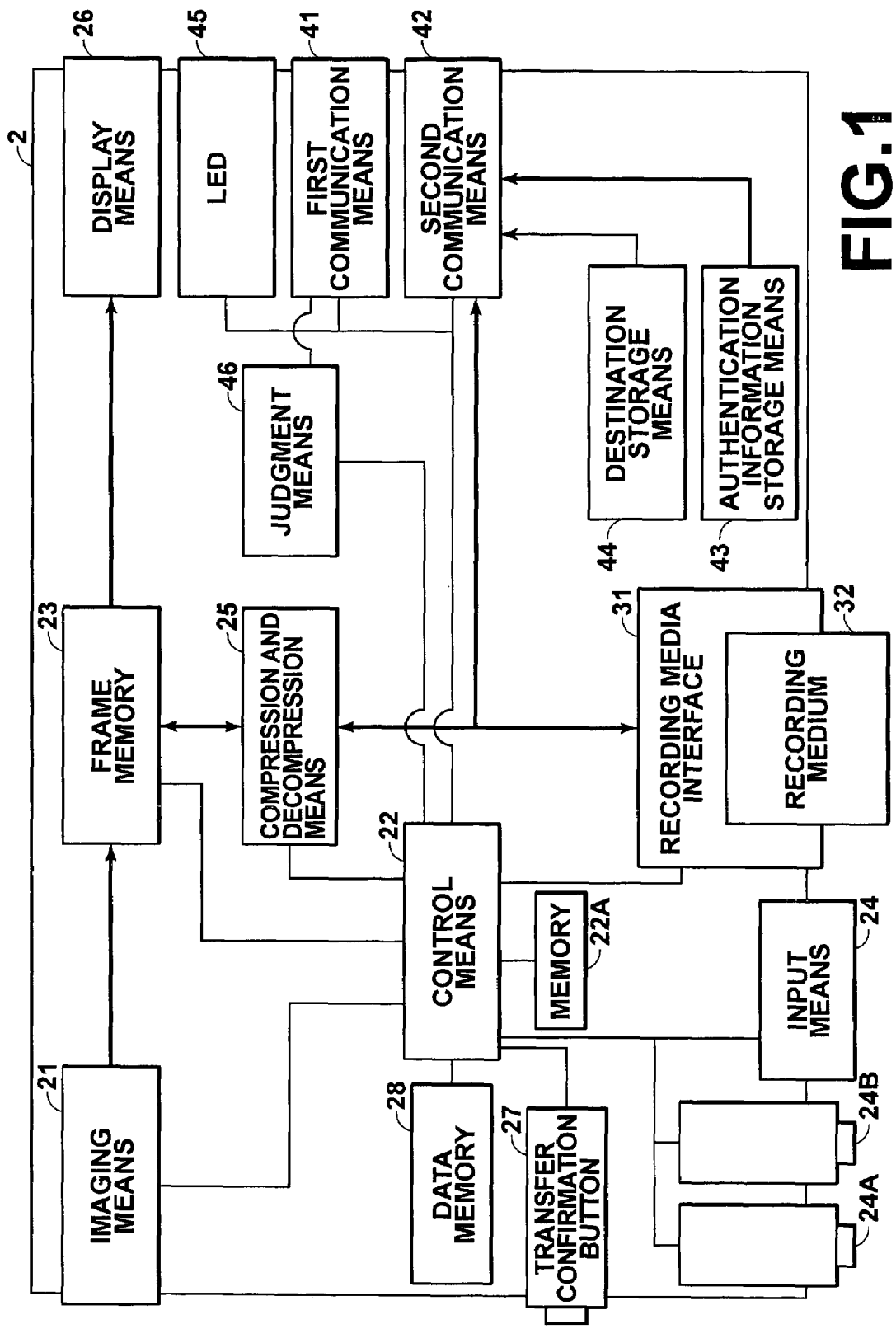
FIG. 1 is a block diagram showing a configuration of a digital camera adopting an imaging apparatus of a first embodiment of the present invention.
Figure 2:
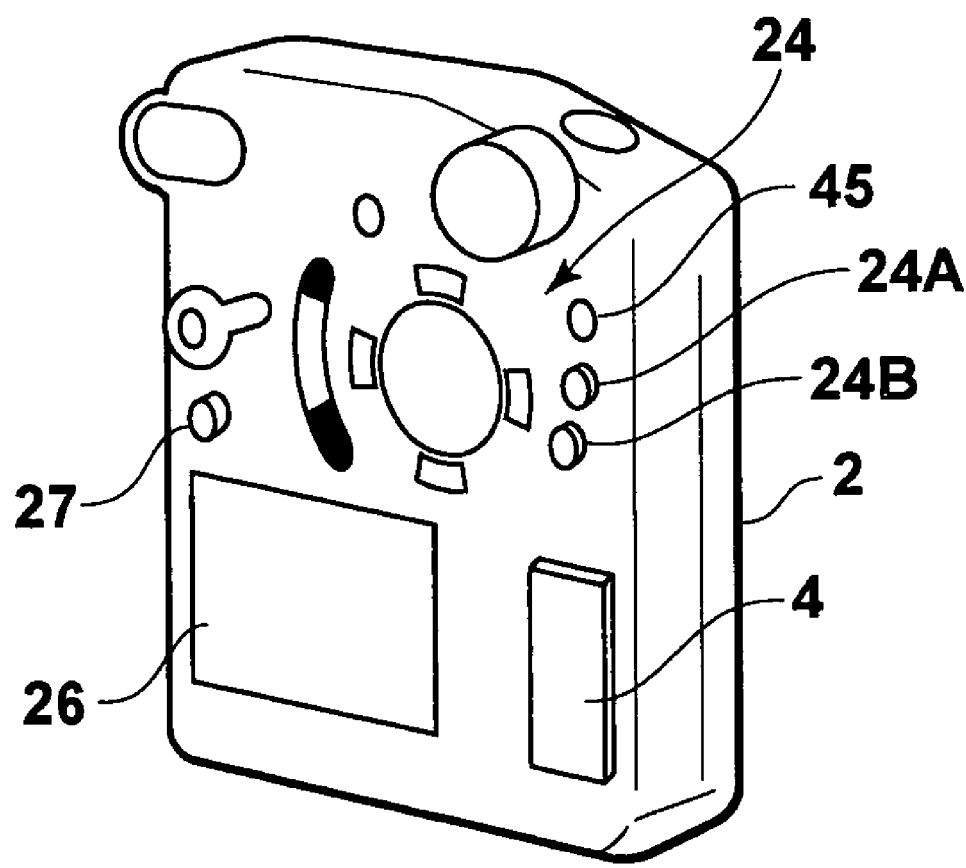
FIG. 2 is a perspective view of the rear of the digital camera in the first embodiment.

Hereinafter, embodiments of the present invention will be explained with reference to the accompanying drawings. FIG. 1 is a block diagram showing a configuration of a digital camera as an imaging apparatus adopting a wireless communication apparatus of a first embodiment of the present invention, and FIG. 2 is a perspective view of the rear of the digital camera. As shown in FIGS. 1 and 2, a digital camera 2 of the first embodiment comprises imaging means 21, control means 22, a frame memory 23, input means 24, compression and decompression means 25, display means 26, a transfer confirmation button 27, a data memory 28, a recording media interface 31, first communication means 41, second communication means 42, authentication information storage means 43, destination storage means 44, an LED 45, and judgment means 46. The imaging means 21 obtains image data sets S0 representing images of subjects by photography thereof. The control means 22 controls the entire digital camera 2. The control means 22 also controls recording, transmission, and display of the image data sets S0, and generates order information C describing the content of an order regarding the image data sets S0. The frame memory 23 stores the image data sets S0 for display thereof. The input means 24 comprises a release button, a communication button, a transmission button, a cross key, a wireless search button 24A, and mobile phone position information acquisition button 24B that will be explained later. The compression and decompression means 25 compresses the image data sets S0 according to a format such as JPEG, and decompresses the compressed image data sets. The display means 26 comprises a liquid crystal display monitor for displaying various kinds of information such as the image data sets S0. The transfer confirmation button 27 can be used at the time of photography of each of the image data sets S0 for confirming an intension of transfer thereof to a destination that will be explained later with which a printing order is placed. The data memory 28 stores the image data sets S0 and image data sets S1 selected from the image data sets S0 (hereinafter referred to as the selected image data sets S1). The recording media interface 31 is used for data conversion for reading and recording the image data sets S0 from and in a recording medium 32 that is detachable from the digital camera 2. The first communication means 41 is used for carrying out data communication via a mobile phone communication network. The second communication means 42 is used for carrying out data communication with wireless LAN communication equipment via a wireless LAN for sending the selected image data sets S1. The authentication information storage means 43 stores authentication information N that is necessary for communicating with the wireless LAN communication equipment and information on the digital camera 2. The destination storage means 44 stores the URL of the destination of the selected image data sets S1. The LED 45 indicates a state of communication via the wireless LAN. The judgment means 46 judges whether or not the digital camera 2 is within a coverage area of the wireless LAN communication equipment.

The first communication means 41, the second communication means 42, the authentication information storage means 43, and the destination storage means 44 are mounted on a dedicated chip and installed in the digital camera 2.

The imaging means 21 comprises a lens, a zoom mechanism, a shutter, and a CCD chip. The imaging means 21 obtains the image data sets S0 representing the images of the subjects by photographing the subjects with use of the shutter.

The control means 22 is connected to a memory 22A comprising a ROM that stores an operation program and the like and a RAM that acts as storage means which is a work area at the time of execution of the program.

A user of the digital camera 2 as a photographer presses the transfer confirmation button 27 during display on the display means 26 of one of the image data sets S0 immediately after photography thereof, in the case where the user wishes to place a printing order regarding the displayed image data set S0. In this manner, the image data set S0 recorded in the frame memory 23 immediately after photography is stored as one of the selected image data sets S1 in the data memory 28. The printing order refers to an order not only for outputting a print but also for recording the selected image data sets S1 in a recording medium such as a CD-R and storage thereof in an image server of a network printing system 1 that will be explained later.

By pressing the transfer confirmation button 27, the user can input the content of the printing order regarding the selected image data set S1 from the input means 24. For example, the selected image data set S1 can be printed and stored in the image server of the network printing system, or recorded in a recording medium such as a CD-R. In the case of printing, the user inputs a print size, a quantity, and the type of printing (such as postcard generation or album printing) by using the input means 24. After the content of the printing order has been input, the order information C describing the content of the order is generated by the control means 22 and stored in the data memory 28 together with the selected image data set S. The content of the order can be input in an order content input screen displayed on the display means 26. The order information C may be generated as a file for each of the selected image data sets S1. Alternatively, only one file for the order information C may be generated so that the content of a printing order can be added thereto every time another selected image data set S1 is newly specified.

The recording medium 32 is a recording medium that is detachable from the digital camera 2, such as a memory card or an MO disc. The recording medium 32 uses semiconductors, magnetic recording, or optical recording for recording the image data sets S0.

The image data sets S0 are stored in the recording medium 32 when the space of the data memory 28 becomes almost fully occupied. In this case, a warning may be issued as a sound made by beeping or the like for notifying the fact so that the image data sets S0 can be stored in the recording medium 32 thereafter. Alternatively, the image data sets S0 may be stored in the recording medium 32 by an instruction from the user using the input means 24.

The first communication means 41 sends the selected image data sets S1 and receives various kinds of data via the mobile phone communication network.

The first communication means 41 is activated by the control means 22 when the selected image data sets S1 are stored in the data memory 28. The first communication means 41 searches for one of base stations of the mobile phone communication network that is communicable with the first communication means, and receives base station information B0 from the base station found as a result of the search. The first communication means 41 inputs the base station information B0 to the judgment means 46. The base station may be searched for only in the case where the mobile phone position information acquisition button 24B is pressed. The base station information B0 is used for judging whether or not the second communication means 42 is within a coverage area of the wireless LAN communication equipment, as will be explained later. In the case where all the selected image data sets S1 that were stored in the data memory 28 have been sent, the search for the base station by the first communication means 41 is stopped.

The second communication means 42 is used for communicating via the wireless LAN with the wireless LAN communication equipment in the network printing system that will be explained later. The second communication means has a data transfer rate of 8~11 Mbps or more. The second communication means supports the IEEE 802.11b standard, as in the case of the wireless LAN communication equipment that will be explained later.

The authentication information storage means 43 stores the authentication information N that is necessary for communication between the second communication means 42 and the wireless LAN communication equipment, and the information on the digital camera 2.

The authentication information N adopts ESS-ID corresponding to the MAC address of the wireless LAN communication equipment, and WEP for encryption. The same WEP is used for the wireless LAN communication equipment.

The information on the digital camera 2 refers to a model name thereof. The information may also include a photography condition used at the time of photography of the respective image data sets S0. By sending the information including the model name and the photography condition to the network printing system together with the selected image data sets S1, image processing according to the model of the digital camera 2 and according to the photography condition can be carried out on the selected image data sets S1 in a minilaboratory or the like installed in a DPE store of the network printing system.

The destination storage means 44 stores the URL of the destination to which the selected image data sets S1 are sent. More specifically, the URL of the DPE store in the network printing system is stored in the destination storage means 44. The URL stored in the destination storage means 44 is referred to when the selected image data sets S1 are sent to the destination.

The URLs of a plurality of destinations may be stored in the destination storage means 44 so that the user can select one of the destinations to which the selected image data sets S1 are sent.

The LED 45 is controlled by the control means 22 so that the LED 45 is turned on to emit blue light in the case where the second communication means 42 is within the coverage area of the wireless LAN communication equipment, and is turned off otherwise. In the case where communication with the wireless LAN communication equipment is not stable, the control means 22 causes the LED 45 to flash.

In the case where the second communication means 42 is within a coverage area of wireless LAN communication equipment installed by another wireless service provider that provides a roaming service with a wireless service provider of the user of the digital camera 2, that is, in the case where the wireless LAN communication means 42 is within a roaming area, the control means 22 turns on the LED 45 to emit red light. In the case where communication is unstable in the roaming area, the control means 22 causes the LED 45 to flash.

In the case where an instruction for confirming whether or not the selected image data sets s1 are stored in the data memory 28 is input from the input means 24, the control means 22 also turns on the LED 45 to emit orange light if a result of the judgment is affirmative, and turns off the LED 45 otherwise.

The judgment means 46 judges whether or not the wireless LAN communication equipment that is communicable with the second communication means 42 via the wireless LAN exists in a coverage area of the base station from which the base station information B0 was obtained, based on the base station information B0 input from the first communication means 41. More specifically, the judgment means 46 has a database of information B0 on the base stations whose coverage areas include locations of the wireless LAN communication equipment to be communicable with the second communication means 42. When the base station information B0 is received from the first communication means 41, the judgment means 46 refers to the database, and judges whether or not the second communication means 42 is within the coverage area of the wireless LAN communication equipment.

The first communication means 41 may receive the base station information B0 from more than one of the base stations. In this case, the judgment means 46 makes the judgment by using the base station information B0 sent from one of the base stations that has the strongest field intensity.

In the case where the result of the judgment is affirmative, information representing the affirmative result is input to the control means 22, and the control means 22 activates the second communication means 42. In this manner, the data communication with the wireless LAN communication equipment starts. After all the selected image data sets S1 that were stored in the data memory 28 have been sent, the control means stops the operation of the second communication means 42.

The judgment may be made only in the case where the user presses the wireless search button 24A.

The judgment means 46 may have the database only on the wireless LAN communication equipment installed by the wireless service provider of the user.

Figure 3:
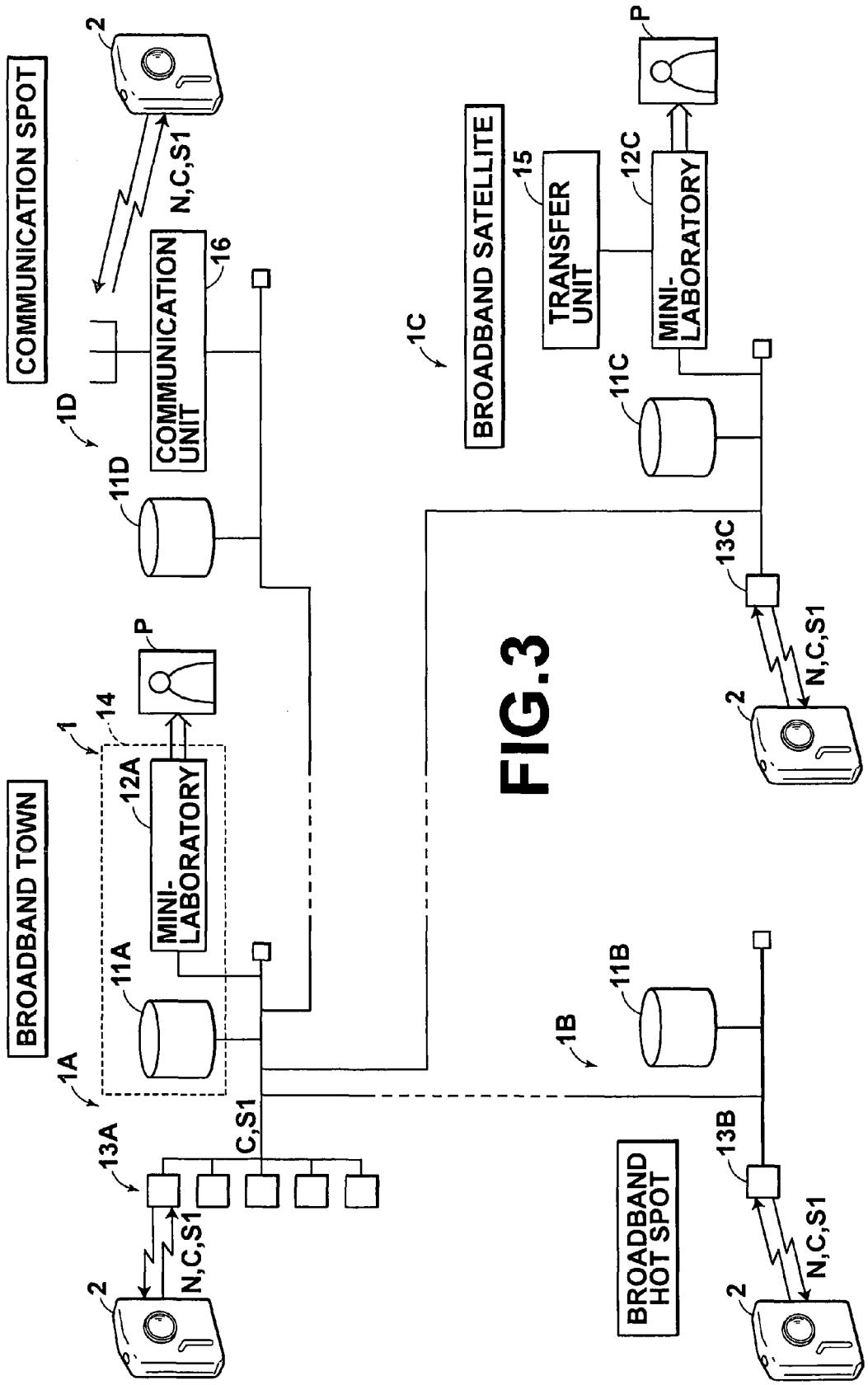
FIG. 3 is a block diagram showing a configuration of a network printing system.

FIG. 3 is a block diagram showing a configuration of the network printing system 1. As shown in FIG. 3, the network printing system 1 provides printing services regarding the selected image data sets S1 that were obtained by the digital camera 2 through photography and selected therefor.

The network printing system 1 comprises a broadband town 1A, a broadband hot spot 1B, a broadband satellite 1C, and a communication spot 1D. The network printing system 1 may comprise a plurality of broadband hot spots 1B, broadband satellites 1C, and communication spots 1D.

The broadband town 1A comprises a large-capacity image server 11A for storing the selected image data sets S1, a mini-laboratory 12A for generating prints P based on the selected image data sets S1 and for recording the selected image data sets S1 in a recording medium such as a CD-R, and a plurality of pieces of wireless LAN communication equipment 13A. The image server 11A, the mini-laboratory 12A, and the wireless LAN communication equipment 13A are networked via a wired LAN. The broadband town 1A is installed in an area where a DPE store 14 can provide the printing services.

The image server 11A and the mini-laboratory 12A are installed in the DPE store 14 that runs the network printing system 1.

The mini-laboratory 12A reads the selected image data sets S1 stored in the image server 11A according to the content of the printing order described in the order information C sent from the digital camera 2 as will be explained later, and generates the prints P. The mini-laboratory 12A also records the selected image data sets S1 read from the image server 11A in a recording medium such as a CD-R or a DVD-R. Therefore, the mini-laboratory 12A comprises image processing means for carrying out image processing on the selected image data sets S1, a printer, and a media drive.

The plurality of pieces of wireless LAN communication equipment 13A are installed at locations within the service provision area of the DPE store 14 that runs the network printing system 1. For example, the wireless LAN communication equipment 13A is installed at busy places such as a railroad station, a bus stop, a municipal office, a bank, a convenience store, a fast food restaurant, and a downtown area, or in an Internet café.

The wireless LAN communication equipment 13A may comprise Airstation WLA-L11G manufactured by MELCO INC., for example. The wireless LAN communication equipment 13A enables communication with either the wired LAN or the wireless, and supports the IEEE 802.11b standard. The wireless LAN communication equipment 13A realizes wireless LAN communication at a data transfer rate of 11 Mbps. Since the wireless LAN communication equipment 13A has been Wi-Fi (the standard for Wireless Fidelity) certified, the wireless LAN communication equipment 13A enables communication with various Wi-Fi certified products. The wireless LAN communication equipment 13A also enables communication via the wireless within a range of 50 m in an office having only a small number of obstacles, a range of 25 m in an office having a large number of obstacles, and a range of 160 m outdoors with no obstacles. Furthermore, since the wireless LAN communication equipment 13A can deal with roaming, communication can be carried out even if the user of the digital camera 2 is moving. Moreover, the wireless LAN communication equipment 13A has a multi-channel (14 channels) function for reducing a network load, in addition to a function of MAC address registration and a security function using WEP.

A MAC address is a physical address specific to each piece of network equipment. The first 3 bytes of a MAC address represent a vendor code and are assigned and managed by IEEE. The remaining 3 bytes represent a user code, and are assigned and managed by each manufacturer of the network equipment as numbers specific thereto. No two MAC addresses are the same. A unique physical address is assigned by the 6-byte data. Since each of the MAC addresses is represented by the 6-byte data, up to 1.7 million pieces of network equipment can theoretically be recognized by Wi-Fi.

As an infrastructure of the wired LAN and the wireless, Speed Net provided by Tokyo Electric Power Company can be used, for example. Speed Net can provide a service of data transfer at almost the same speed as an ADSL with a fixed charge therefor, by using an optical fiber network and radio antennas installed on utility poles of the company. Speed Net enables wireless LAN communication in a range of 50~300 m from each of the radio antennas. In this case, by installing the wireless LAN communication equipment 13A in a place where one of the radio antennas is located, the network printing system 1 can be configured to use the infrastructure of Speed Net.

A communication service by using a wireless provided by Mobile Internet Services Inc. (MIS) may also be used as the infrastructure for the wired LAN and the wireless in this embodiment.

The broadband hot spot 1B comprises an image server 11B and wireless LAN communication equipment 13B that has the same function as the wireless LAN communication equipment 13A and is connected to the image server 11B via a wired LAN. The capacity of the image server 11B is smaller than that of the image server 11A, and the image server 11B is used for temporarily storing the selected image data sets S1. The broadband hot spot 1B is also connected to the broadband town 1A via a wired LAN. The broadband hot spot 1B is installed in a location remote from the service provision area of the DPE store 14 that runs the network printing system 1. For example, if the DPE store 14 is located in Odawara, the remote location refers to a theme park such as Tokyo Disneyland or Universal Studios Japan, a sightseeing spot around Japan, a downtown area in a neighboring city, an airport, a major railroad station around Japan, a fast food restaurant, or a rest area on a highway, for example.

A plurality of pieces of the wireless LAN communication equipment 13B may be used.

The broadband satellite 1C comprises an image server 1C, a mini-laboratory 12C, and wireless LAN communication equipment 13C that are networked via a wired LAN and has almost the same function as the broadband town 1A. The capacity of the image server 11C for temporarily storing the selected image data sets S1 is smaller than that of the image server 11A. The mini-laboratory 12C generates the prints P based on the selected image data sets S1. The broadband satellite 1C is connected to the broadband town 1A via a wired LAN. The broadband satellite 1C is installed in a location away from the area wherein the DPE store 14 that runs the network printing system 1 can provide the services, as in the case of the broadband hot spot 1B.

Since the broadband satellite 1C has the mini-laboratory 12C, the prints P can be generated immediately after reception of the selected image data sets S1 at the remote location. However, the mini-laboratory 12C is smaller than the mini-laboratory 12A installed in the DPE store 14 in the broadband town 1A. Therefore, the mini-laboratory 12C can only generate a print of L size, for example. For this reason, the mini-laboratory 12C has a transfer unit 15, and the transfer unit 15 judges whether or not the order described by the order information C can be dealt with by the mini-laboratory 12C. The prints P are generated in the mini-laboratory 12C only in the case where the order can be dealt with by the mini-laboratory 12C. In the case where the mini-laboratory 12C cannot deal with the order, the selected image data sets S1 and the order information C received by the broadband satellite 1C are sent from the transfer unit 15 to the DPE store 14 in the broadband town 1A where the prints P are generated.

A plurality of pieces of the wireless LAN communication equipment 13C may also be installed.

The communication spot 1D is installed in one of the base stations of the mobile phone communication network. The communication spot 1D comprises a communication unit 16 for carrying out communication via the mobile phone communication network and an image server 11D having capacity that is smaller than that of the image server 11A. The communication unit 16 and the image server 11D for temporarily storing the selected image data sets S1 are connected via a wired LAN. The communication spot 1D is also connected to the broadband town 1A via a wired LAN.

Since the communication spot 1D is used for communication via the mobile phone communication network, the coverage area thereof is much wider than coverage areas of the broadband town 1A, the broadband hot spot 1B, and the broadband satellite 1C.

The communication unit 16 detects a communication load on the mobile phone communication network when the communication with the digital camera 2 starts as will be explained later. In the case where the communication load is smaller than a predetermined threshold value, the communication unit 16 sends to the digital camera 2 permission to send the selected image data sets S. The communication unit 16 then receives the selected image data sets S1 sent from the digital camera 2. In the case where the communication load is not smaller than the threshold value, the communication unit 16 sends information representing the fact that the image data transfer is not permitted to the digital camera 2, since the cost therefor would be too high because of the excessive amount of time necessary therefor.

When the user of the digital camera 2 moves to the coverage area of the wireless LAN communication equipment 13A, 13B, or 13C (hereinafter referred to as the wireless LAN communication equipment 13A~13C) and the second communication means 42 becomes communicable with the wireless LAN communication equipment 13A~13C, the control means 22 reads the authentication information N from the authentication information storage means 43, and sends the authentication information N to the wireless LAN communication equipment 13A~13C via the second communication means 42. The wireless LAN communication equipment 13A~13C judges whether or not the digital camera 2 that sent the authentication information N has been registered with the network printing system 1 run by the DPE store 14. In the case where a result of the judgment is affirmative and the digital camera 2 has been authenticated, the control means 22 sends the selected image data sets S1 stored in the data memory 28 to the wireless LAN communication equipment 13A~13C, together with the information on the digital camera 2 and the order information C, via the second communication means 42.

In the case where the user of the digital camera 2 wishes to send the selected image data sets S1 at a location outside the coverage area of the wireless LAN communication equipment 13A~13C in the broadband town 1A, the broadband hot spot 1B, or the broadband satellite 1C but communicable only with the communication spot 1D, the user tries to send the selected image data sets S1 by using the first communication means 41.

The communication unit 16 in the communication spot 1D judges the communication load on the mobile phone communication network, and permits communication with the digital camera 2 only in the case where the communication load is not larger than the predetermined threshold value, as has been described above. In the digital camera 2, the control means 22 reads the selected image data sets S1 and the order information C from the data memory 28, and sends the selected image data sets S1 and the order information C to the communication spot 1D via the first communication means 41. In the case where the digital camera 2 receives the information representing the fact that the communication is not permitted due to a heavy communication load, the control means 22 disconnects the connection between the first communication means 41 and the communication spot 1D.

Figure 4B:
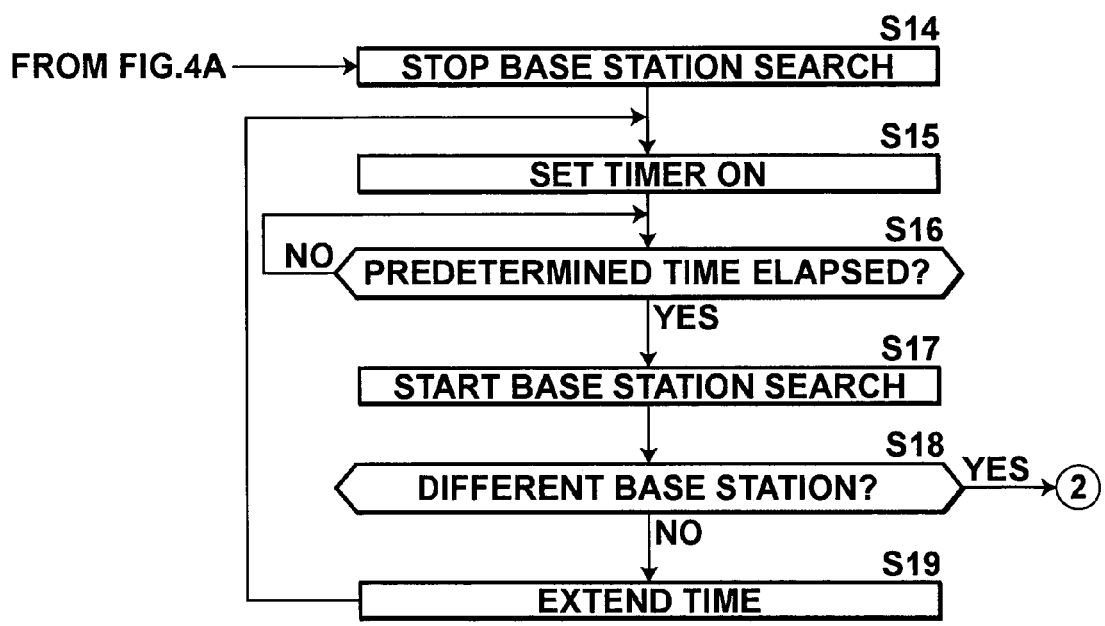

The operation of the first embodiment will be explained next. Procedures carried out at the time of sending the selected image data sets S1 from the digital camera 2 will be explained first. FIG. 4A and FIG. 4B show a flow chart illustrating the procedures. At the time of transfer of the selected image data sets S1 from the digital camera 2, the same procedures are carried out in the broadband town 1A, in the broadband hot spot 1B, or in the broadband satellite 1C. Therefore, the procedures carried out at the time of sending the selected image data sets S1 from the digital camera 2 to the broadband town 1A will be explained.

In the explanations below, it is assumed that the authentication information N necessary for communication with the wireless LAN communication equipment 13A has been obtained for the digital camera 2 and stored in the authentication information storage means 43. At the same time, it is also assumed that the selected image data sets S1 have been obtained by photography and stored in the data memory 28. Furthermore, the order information C for the selected image data sets S1 has already been generated and stored in the data memory 28. Therefore, the selected image data sets S1 are ready to be transferred.

The control means 22 is monitoring whether or not the selected image data sets S1 are stored in the data memory 28 (Step S1). If a result at Step S1 is affirmative, the first communication means 41 searches for the communicable base station in the mobile phone communication network (Step S2). The base station information B0 sent from the communicable base station is received by the first communication means 41 (Step S3). The base station information B0 is input to the judgment means 46, and the judgment means 46 judges whether or not the second communication means 42 is within the coverage area of the wireless LAN communication equipment 13A, with reference to the database (Step S4).

In the case where the selected image data sets S1 are stored in the data memory 28, the LED 45 is turned on to emit orange light in response to an instruction input by the user from the input means 24 for data confirmation. Therefore, the user can visually confirm storage of the selected image data sets S1 in the data memory 28.

If a result at Step S4 is affirmative, the second communication means 42 is activated (Step S5), and the base station search by the first communication means 41 is stopped (Step S6). In this manner, the connection between the second communication means 42 and the wireless LAN communication equipment 13A via the wireless is established (Step S7). By stopping the bases station search, the operation of the first communication means 41 is also stopped. At this time, the LED 45 is turned on to emit blue light, and flashes in the case where the communication via the wireless LAN is unstable. Therefore, the user can visually understand the state of communication with the wireless LAN communication equipment 13A.

In this state, the selected image data sets S1 are sent from the digital camera 2 to the wireless LAN communication equipment 13A (Step S8). More specifically, the control means 22 reads the authentication information N stored in the authentication information storage means 43, and sends the authentication information N to the wireless LAN communication equipment 13A via the second communication means 42. In the case where the digital camera 2 has been authenticated, the order information C and the selected image data sets S1 stored in data memory 28 are sent to the wireless LAN communication equipment 13A. The selected image data sets S1 and the order information C are sent to and stored in the image server 11A of the DPE store 14 where the prints P are generated according to the order information C.

Whether all the selected image data sets S1 have been sent or not is judged (Step S9). If a result at Step S9 is negative, whether or not the second communication means 42 is within the coverage area of the wireless LAN communication equipment 13A is judged, in consideration of a possibility of the user being on the move (Step S10). If a result at Step S10 is affirmative, the process returns to Step S8 and transmission of the selected image data sets S1 is continued. If the result at Step S10 is negative, the second communication means 42 is inactivated (Step S11), and the process goes back to Step S2. The base station search by the first communication means 41 is started again, and the procedures from Step S2 are repeated.

If the result at Step S9 is negative, the connection between the second communication means 42 and the wireless LAN communication equipment 13A is disconnected (Step S12), and the second communication means 42 is inactivated (Step S13). The process then returns to Step S1.

If the result at Step S4 is negative, the base station search by the first communication means 41 is stopped (Step s14), and the control means starts a timer for measuring a predetermined time until starting another search for the communicable base station (Step S15). In this state, the LED 45 is turned off. Monitoring is started for judging whether or not the predetermined time has elapsed (Step S16). When a result at Step S16 becomes affirmative, the base station search is started again (Step S17). Whether or not the base station from which the base station information B0 is received is different from the base station whose base station information was received at Step S3 is then judged (Step S18). If a result at Step S18 is affirmative due to a movement of the user, the process goes back to Step S4, and the procedures from Step S4 are then repeated.

If the result at Step S18 is negative because the base station whose base station information B0 is received is the same as the base station whose base station information B0 was received at Step S3, the user is assumed to be stationary. Therefore, the predetermined time of the timer is extended (Step S19), and the process goes back to Step S15. The predetermined time of the timer can be extended gradually to up to 6 hours if the same base station is detected repeatedly.

If the result at Step S4 is negative even after the predetermined time of the timer has been extended to the maximum, the selected image data sets S1 may be sent to the communication spot 1D via the mobile phone communication network. In this case, the selected image data sets S can be sent securely via the mobile phone communication network that covers almost the entire land of Japan although a transfer speed thereof is slow.

Figure 5:
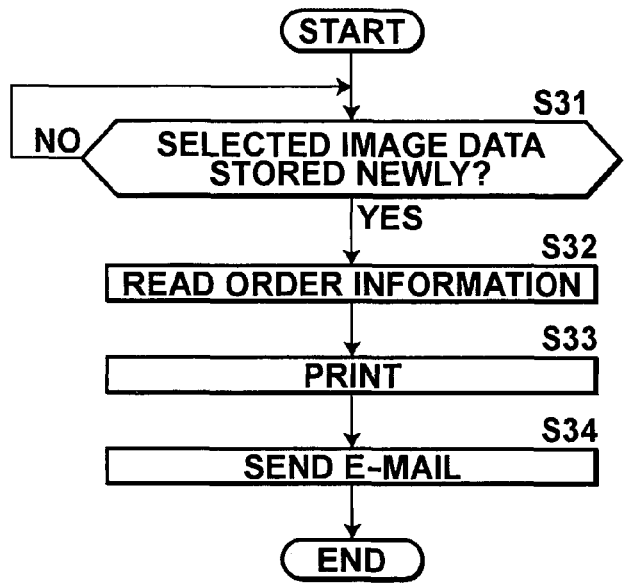
FIG. 5 is a flow chart showing procedures carried out in a broadband town after reception of the selected image data.

Procedures carried out in the network printing system 1 after reception of the selected image data sets S1 will be explained next. FIG. 5 is a flow chart showing the procedures carried out in the broadband town 1A. In this embodiment, the user of the digital camera 2 is assumed to have described printing of the selected image data sets S1 as the content of the printing order in the order information C. In the case where the selected image data sets S1 have been sent to the broadband hot spot 1B, the selected image data sets S1 are temporarily stored in the image server 11B therein, and sent to the image server 11A in the broadband town 1A, based on the URL of the destination.

The mini-laboratory 12A regularly accesses the image server 11A, and judges whether or not the selected image data sets S1 have been stored newly in the image server 11A (Step S31). In the case where the selected image data sets s1 have been stored newly, a result at Step S31 becomes affirmative, and the mini-laboratory 12A reads the order information C sent together with the selected image data sets S1 (Step S32).

The selected image data sets S1 are read from the image server 11A according to the content of the printing order described in the order information C, and printed after necessary image processing is carried out thereon (Step S33). More specifically, the selected image data sets S1 are printed according to the size, the quantity, and the type of printing described in the order content. After completion of the printing, an E-mail message and an order reception number issued by the DPE store are sent to the user of the digital camera 2 for notifying the completion of printing (Step S34) to end the process.

The user knows the completion of printing of the selected image data sets S1 by viewing the E-mail message, and visits the DPE store 14 for reception of the prints P. At this time, the user is authenticated by the order reception number received together with the E-mail message, and the prints P are provided to the user. In the case where the prints P are to be delivered to a place registered in advance (such as the address of the user) according to an agreement between the DPE store 14 and the user, the prints P are delivered thereto.

A printing charge may be paid directly by the user to the DPE store 14. Alternatively, since the user pays a communication charge to the wireless service provider for communication via the wireless, the user may pay the printing charge to the provider so that the printing charge can be paid to the DPE store 14 via the provider. In this case, since the wireless service provider provides a discount service of its own to the user, the provider can provide a further discount service via the DPE store 14, such as discounting the communication charge in accordance with the use of the DPE store 14.

Figure 6:
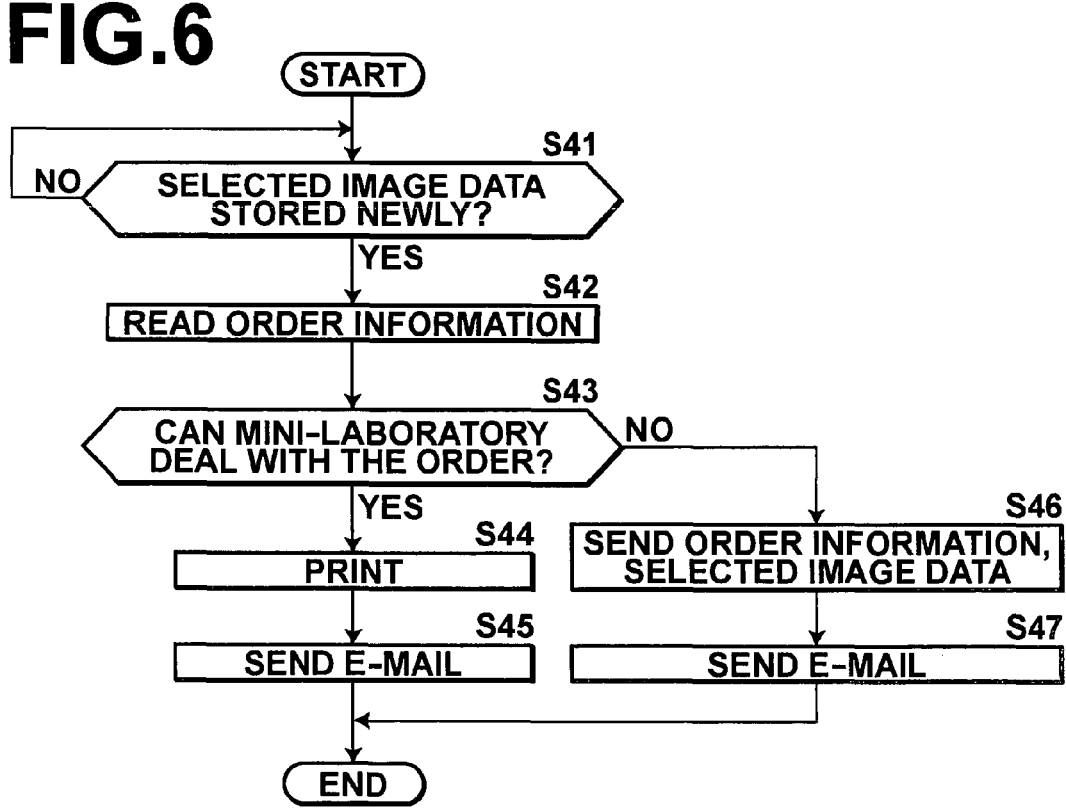
FIG. 6 is a flow chart showing procedures carried out in a broadband satellite after reception of the selected image data.

FIG. 6 is a flow chart showing procedures carried out after the selected image data sets S1 are received by the broadband satellite 1C. The user is again assumed to have described printing of the selected image data sets S1 as the content of the printing order in the order information C.

The case where the user sends the selected image data sets S1 to the broadband satellite 1C refers to the case where the user is in a place where the broadband satellite 1C is located. Therefore, before the user visits the place, the user stores the URL of the image server 11C of the broadband satellite 1C in the destination storage means 44. By selecting the image server 11C in the broadband satellite 1C as the destination of the selected image data sets S1, the selected image data sets S1 are sent to and stored in the image server 11C. The user can select the destination from destinations displayed on the display means 26 by using the input means 24.

The mini-laboratory 12C regularly accesses the image server 11C, and judges whether or not the selected image data sets S1 have newly been stored in the image server 11C (Step S41). In the case where the selected image data sets S1 have been stored newly and a result at Step S41 is thus affirmative, the mini-laboratory 12C reads the order information C received together with the selected image data sets S1 (Step S42).

The transfer unit 15 judges whether or not the content of the printing order described in the order information C can be dealt with by the mini-laboratory 12C (Step S43). If a result at Step S43 is affirmative, the selected image data sets S1 are read from the image server 11C and printed after necessary image processing is carried out thereon, based on the content of the printing order described in the order information C (Step S44). More specifically, the selected image data sets S1 are printed according to the size, the quantity, and the type of printing described in the content of the printing order. After completion of the printing, an E-mail message notifying the completion of printing is sent to the user of the digital camera 2 together with a reception number issued by the broadband satellite 1C (Step S45) to end the process.

The user of the digital camera 2 knows the completion of printing of the selected image data sets S1 he/she sent, by viewing the E-mail message. The user then visits the broadband satellite 1C to receive the prints P. At this time, the user is authenticated by the reception number sent together with the E-mail message, and the user can receive the prints P. In the case where the prints P are to be delivered to the user according to the agreement between the user and the DPE store 14, the prints P are delivered to the place (the address of the user, for example) that has been registered in advance.

Since the broadband satellite 1C is installed in a theme park or the like where the user visits, the user can obtain the prints P generated from the selected image data sets S1 immediately at the place.

If the result at Step S43 is negative, the printing order cannot be dealt with by the mini-laboratory 12C. Therefore, the transfer unit 15 sends the selected image data sets S1 and the order information C to the image server 11A of the DPE store 14 (Step S46). An E-mail message is sent to the user for notifying the user of the fact that the printing is carried out by the DPE store 14 regarding the selected image data sets S1 sent by the user (Step S47), to end the process.

The user knows that the printing is carried out by the DPE store 14, by viewing the message.

As has been described above, according to the first embodiment, the first communication means 41 receives the base station information B0 from one of the base stations in the mobile phone communication network. Whether or not the second communication means 42 is within the coverage area of the wireless LAN communication equipment 13A is judged by judging whether or not the coverage area of the wireless LAN communication equipment 13A is within the coverage area of the base station represented by the base station information B0. If the result is affirmative, the second communication means 42 is activated to send the selected image data sets S1 to the wireless LAN communication equipment 13A. Although the first communication means 41 receives the base station information B0, power consumption thereof is extremely low. Therefore, by reducing the power consumption through prevention of continuous operation of the second communication means 42, whether or not the second communication means 42 is within the coverage area of the wireless LAN communication equipment 13A can be judged with comparatively low power consumption.

Figure 7:
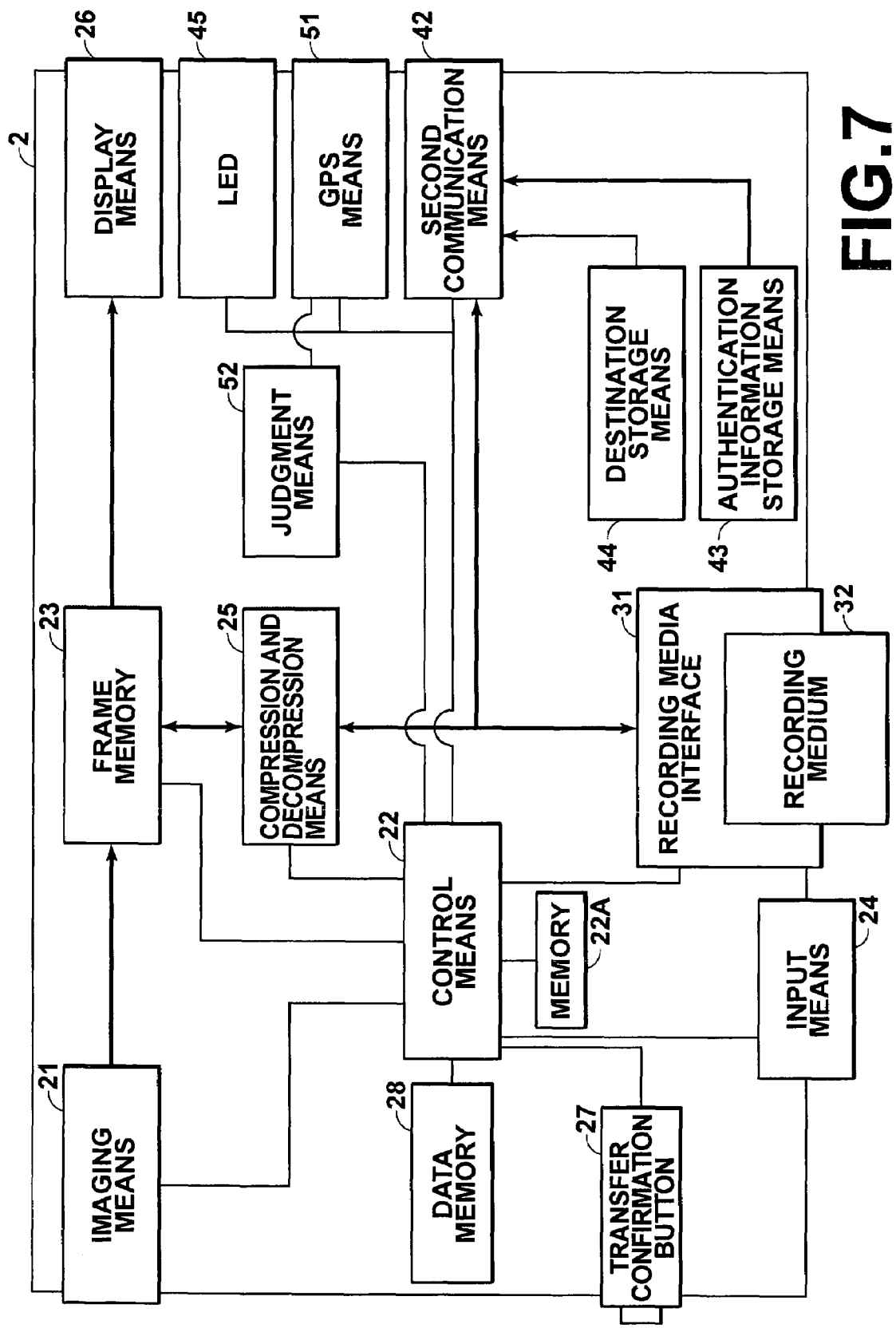
FIG. 7 is a block diagram showing a configuration of a digital camera adopting an imaging apparatus of a second embodiment of the present invention.

A second embodiment of the present invention will be explained next. FIG. 7 is a block diagram showing a configuration of a digital camera adopting an imaging apparatus of the second embodiment of the present invention. In the second embodiment, the same elements as in the first embodiment have the same reference numbers, and detailed explanations thereof will be omitted. In the second embodiment, the digital camera 2 comprises GPS means 51 for receiving GPS information G0 from GPS satellites and judgment means 52 for judging whether or not the digital camera 2 is within one of the coverage areas of the wireless LAN communication equipment by using the GPS information G0, instead of the first communication means 41 and the judgment means 46.

The judgment means 52 judges whether or not the digital camera 2 is within one of the coverage areas of the wireless LAN communication equipment, based on the GPS information G0 input from the GPS means 51. More specifically, the judgment means 52 has a database including latitude and longitude information for specifying the coverage areas of the wireless LAN communication equipment. When the GPS information G0 is input from the GPS means 51, the judgment means 52 refers to the database, and judges whether or not the digital camera 2 is within one of the coverage areas of the wireless LAN communication equipment.

If a result of the judgment is affirmative, information representing the result is input to the control means 22, and the second communication means 42 is activated for data communication with the communicable wireless LAN communication equipment. The selected image data sets S1 stored in the data memory 28 are then sent to the communicable wireless LAN communication equipment. The control means 22 stops the operation of the second communication means 42 after all the image data sets S1 that were stored in the data memory 28 have been sent.

Instead of the wireless search button 24A and the mobile phone position information acquisition button 24B in the first embodiment, the digital camera 2 of the second embodiment may comprise a GPS search button for activating the GPS means 51 so that the judgment is made only in the case where the GPS button is pressed.

Figure 8A:
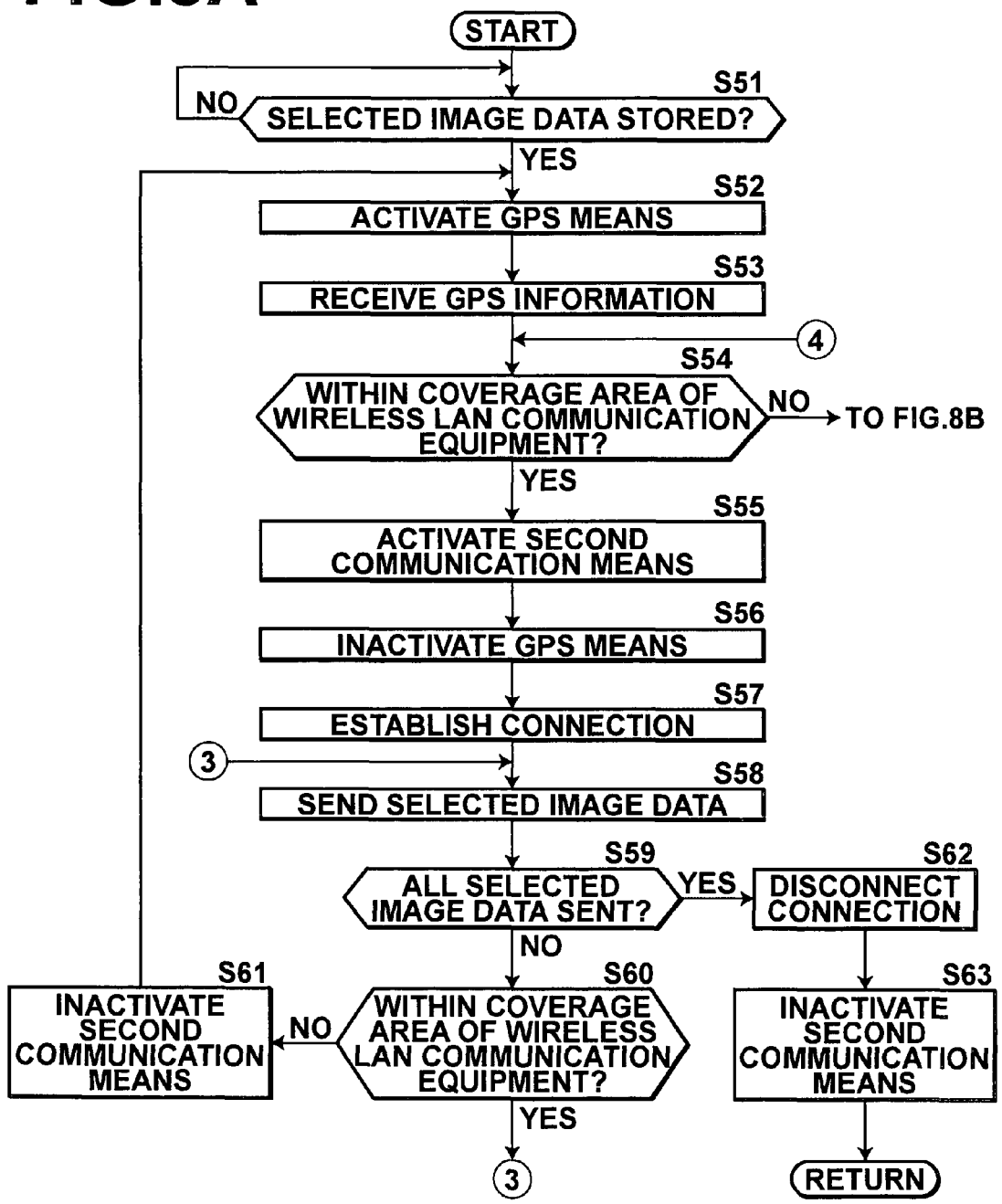
FIG. 8A and FIG. 8B a flow chart illustrating the procedures carried out at the time of sending selected image data in the second embodiment.
Figure 8B:
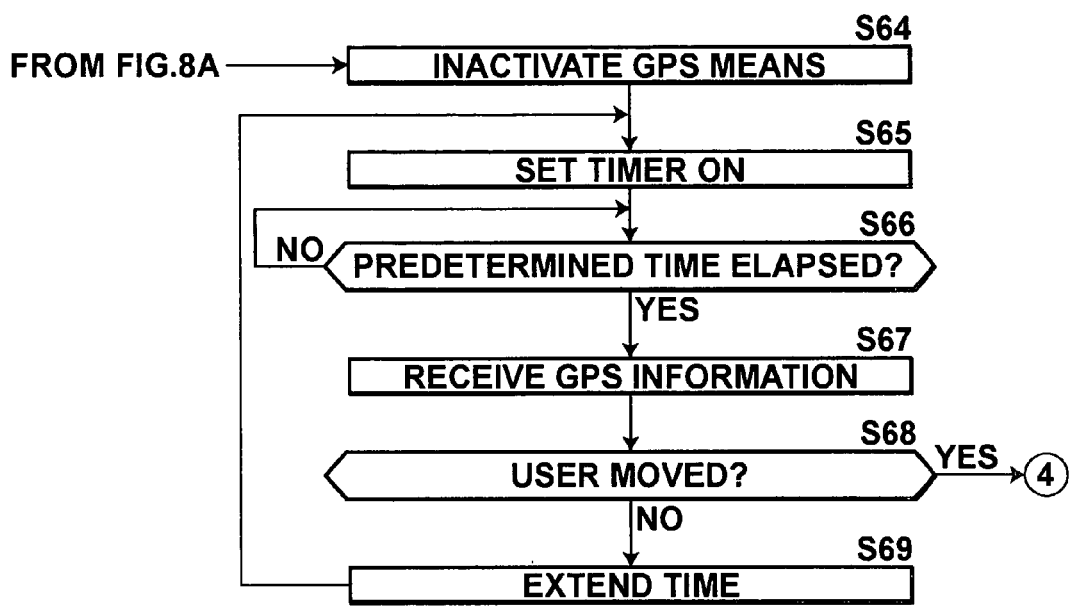

The operation of the second embodiment will be explained next. Procedures carried out at the time of transmission of the selected image data sets S1 from the digital camera 2 will be explained. FIG. 8A and FIG. 8B show a flow chart illustrating the procedures. The case where the selected image data sets S1 are sent from the digital camera 2 to the broadband town 1A will be explained, as in the first embodiment.

The control means 22 judges whether or not the selected image data sets S1 are stored in the data memory 28 (Step S51). If a result at Step S51 is affirmative, the GPS means 51 is activated (Step S52), and the GPS information G0 is received from the GPS satellites (Step S53). The GPS information G0 is input to the judgment means 52, and the judgment means 52 judges whether or not the second communication means 42 is within the coverage area of the wireless LAN communication equipment 13A, with reference to the database (Step S54).

If a result at Step S54 is affirmative, the second communication means 52 is activated (Step S55), and the GPS means is inactivated (Step S56). In this manner, the connection between the second communication means 42 and the wireless LAN communication equipment 13A is established (Step S57). In this state, the selected image data sets S1 are sent from the digital camera 2 to the wireless LAN communication equipment 13A (Step S58).

Whether all the selected image data sets S1 have been sent or not is then judged (Step S59). If a result at Step S59 is negative, whether or not the second communication means 42 is within the coverage area of the wireless LAN communication equipment 13A is judged, in consideration of a possibility of the user being on the move (Step S60). If a result at Step S60 is affirmative, the process returns to Step S58 and transmission of the selected image data sets S1 is continued. If the result at Step S59 is negative, the second communication means 42 is inactivated (Step S61), and the process goes back to Step S52. The GPS means 51 is activated again, and the procedures from Step S52 are repeated.

If the result at Step S59 is affirmative, the connection between the second communication means 42 and the wireless LAN communication equipment 13A is disconnected (Step S62). The second communication mean 42 is then inactivated (Step S63), and the process goes back to Step S51.

If the result at Step S54 is negative, the GPS means 51 is stopped (Step S64), and the control means 22 turns on the timer for measuring the predetermined time until new reception of the GPS information G0 (step S65). Whether or not the predetermined time has elapsed is then judged (Step S66).

When a result at Step S66 is affirmative, the GPS means 51 is activated to receive the GPS information G0 (Step S67). The GPS information G0 that was received earlier is compared with the GPS information received this time, and whether or not the user has moved is judged (Step S68). If a result of judgment is affirmative due to a movement of the user, the process goes back to Step S54 and the procedures from Step S54 are repeated.

If the result at Step S68 is negative due to the user being stationary, the predetermined time of the timer is extended (Step S69). The process goes back to Step S65, and the procedures from Step S65 are then repeated. The predetermined time can be extended gradually to up to 6 hours if the same GPS information G0 is repeatedly received.

Figure 9A:
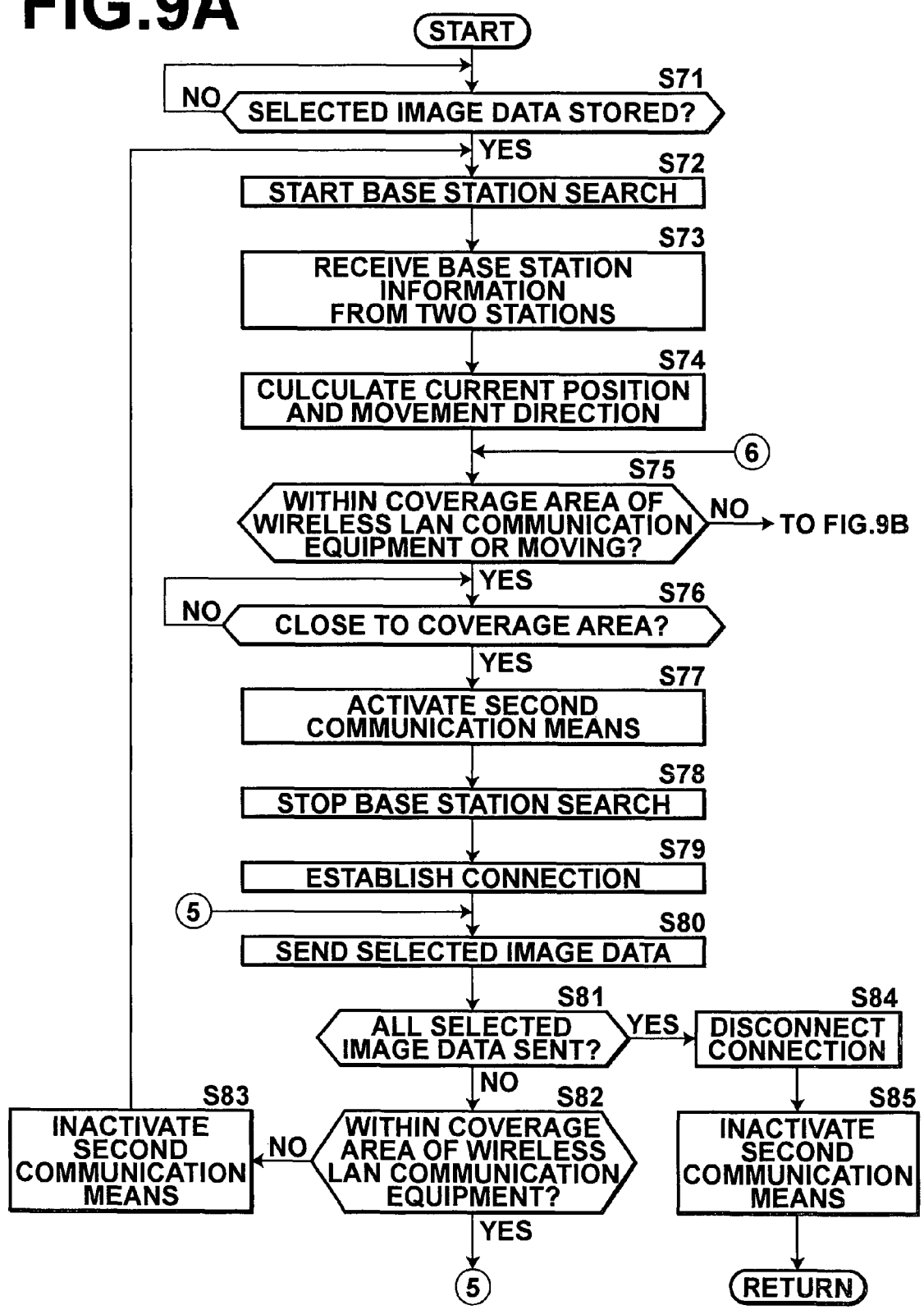
FIG. 9A and FIG. 9B a flow chart illustrating the procedures carried out at the time of sending selected image data in a third embodiment.
Figure 9B:
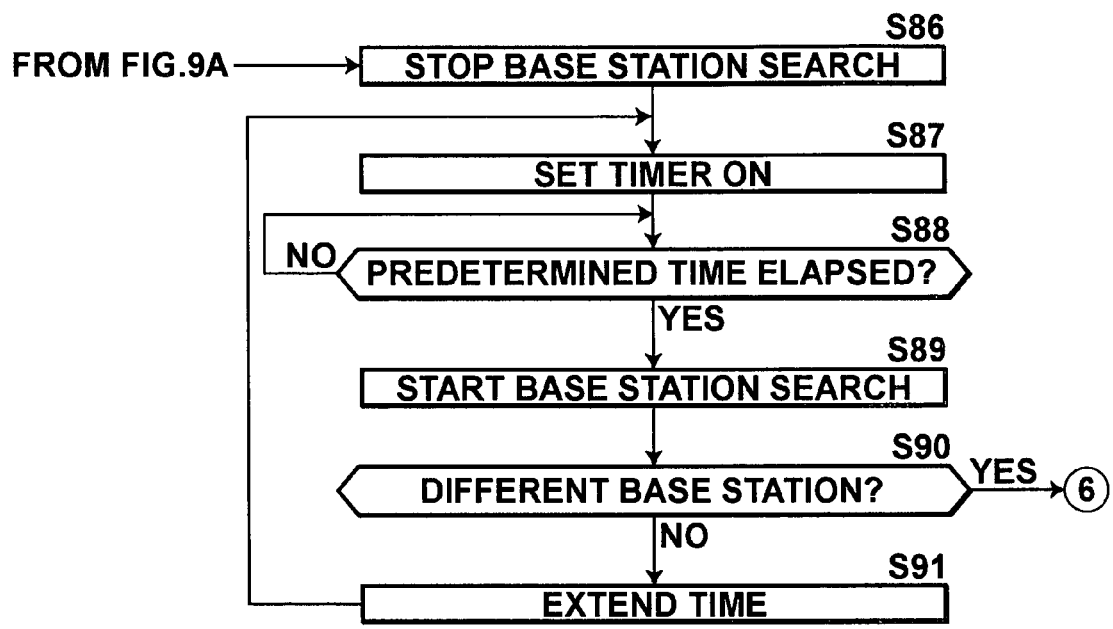

In the first embodiment, the selected image data sets S1 can be sent while taking a direction of a movement by the user into account. Hereinafter, procedures carried out for transmission of the selected image data sets S in consideration of the movement by the user will be explained as a third embodiment of the present invention. FIG. 9A and FIG. 9B show a flow chart illustrating the procedures.

The control means 22 judges whether or not the selected image data sets S1 are stored in the data memory 28 (Step S71). If a result at Step S71 becomes affirmative, the first communication means 41 starts the base station search via the mobile phone communication network (Step S72), and receives the base station information B0 sent from the communicable base station (Step S73). In this case, the first communication means 41 receives the base station B0 from two of the base stations that are communicable with the first communication means 41. The base station B0 is input to the judgment means 46, and an approximate current position of the user and the movement direction thereof are calculated based on the base station information B0 (Step S74). The base station search may be carried out only in the case where the mobile phone position information acquisition button 24B is pressed.

Whether the second communication means 42 is within the coverage area of the wireless LAN communication equipment 13A or is being moved toward the coverage area is judged by referring to the database (Step S75). If a result at Step S75 is affirmative, whether or not the second communication means 42 is close to the coverage area of the wireless LAN communication equipment 13A is judged (Step S76). In the case where the second communication means 42 is already in the coverage area, a result at Step S76 is affirmative.

If the result at Step S76 is affirmative, the second communication means 42 is activated (Step S77), and the base station search by the first communication means 41 is stopped (Step S78). In this manner, the connection between the second communication means 42 and the wireless LAN communication equipment 13A is established (Step S79). The first communication means 41 is inactivated upon suspension of the base station search.

In this state, the selected image data sets S1 are sent from the digital camera 2 to the wireless LAN communication equipment 13A, as in the first embodiment (Step S80).

Whether all the selected image data sets S1 have been sent or not is then judged (Step S81). If a result at Step S81 is negative, whether or not the second communication means 42 is within the coverage area of the wireless LAN communication equipment 13A is judged, in consideration of a possibility of the user being on the move (Step S82). If a result at Step S82 is affirmative, the process returns to Step S80 and transmission of the selected image data sets S1 is continued. If the result at Step S82 is negative, the second communication means 42 is inactivated (Step S83), and the process goes back to Step S72. The first communication means 41 starts the base station search again, and the procedures from Step S72 are repeated.

If the result at Step S81 is affirmative, the connection between the second communication means 42 and the wireless LAN communication equipment 13A is disconnected (Step S84). The second communication mean 42 is inactivated (Step S85), and the process goes back to Step S71.

If the result at Step S75 is negative, the procedures from Step S86 to Step S91, which are the same as Step S14 to Step S19 in the first embodiment, are carried out.

Figure 10:
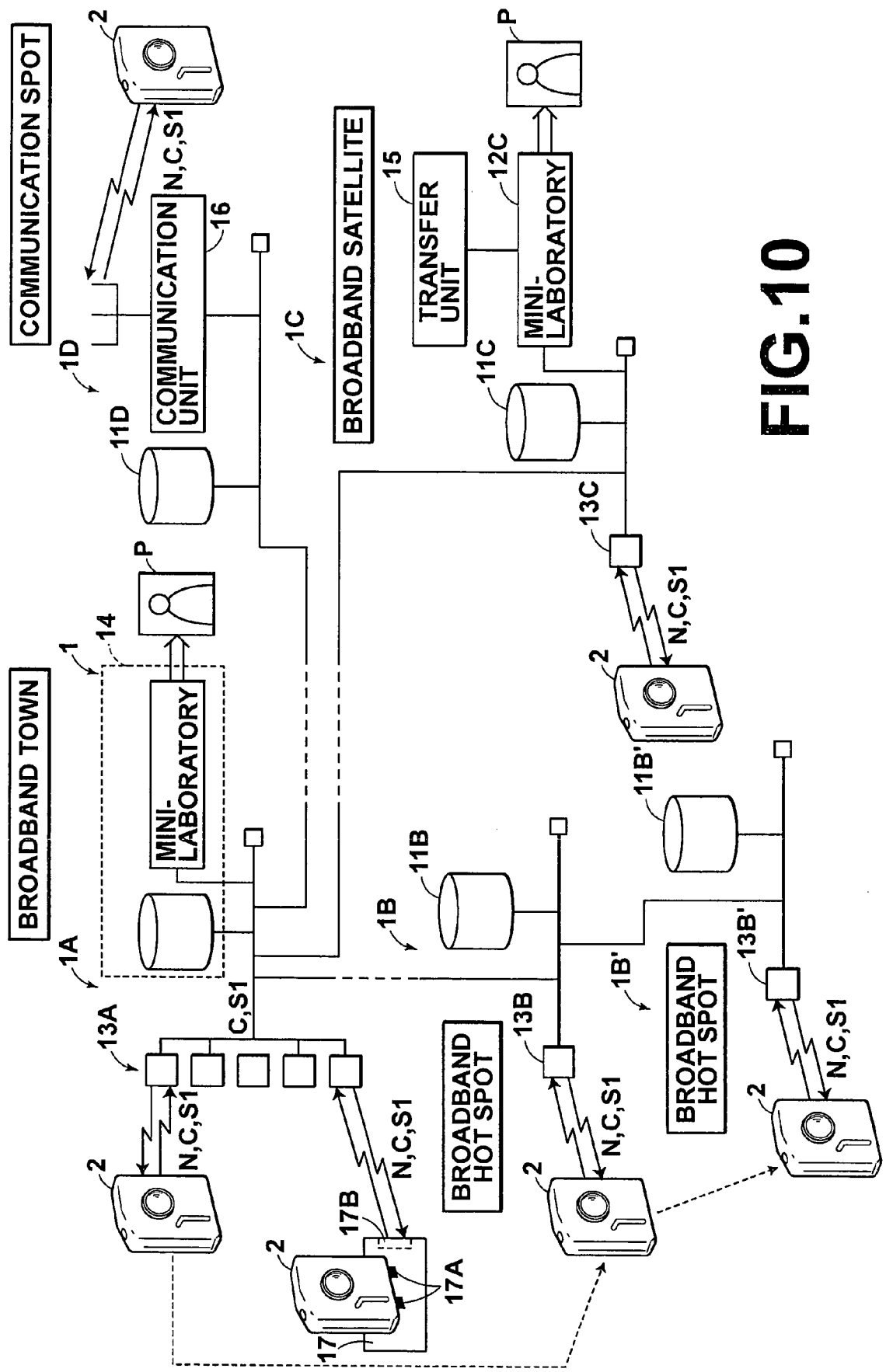
FIG. 10 is a block diagram showing another configuration of a network printing system.

In the first to third embodiments, the broadband town 1A, the broadband hot spot 1B, and the broadband satellite 1C may be run by different wireless service providers. Furthermore, as shown in FIG. 10, a broadband hot spot 1B' which is different from the broadband hot spot 1B may be installed. In such a case, it is preferable for the wireless service providers that run the broadband town 1A, the broadband hot spots 1B and 1B', and the broadband satellite 1C comprising the network printing system 1 to provide a roaming service.

In this manner, if the user of the digital camera 2 moves to any one of the broadband town 1A, the broadband hot spots 1B and 1B', and the broadband satellite 1C that are not necessarily run by the wireless service provider of the user, the user can send he selected image data sets S1 without interruption.

In the case where the user is within the coverage area of the wireless LAN communication equipment 13A~13C installed by the wireless service provider or providers that provide the roaming service to the wireless service provider of the user, that is, in the case where the user is within a roaming area, the LED 45 is turned on to emit red light. Therefore, the user can visually understand the fact that he/she has moved to the roaming area.

In the case of roaming, the user may need to pay an additional charge to the wireless service provider or providers other than the wireless service provider of the user. Therefore, in the case where the roaming service is available, it is preferable for the input means 24 to be able to prohibit roaming. In this manner, if the user does not wish to use the roaming service, the user can avoid paying the additional charge.

In the first to third embodiments described above, the imaging apparatus comprising the wireless LAN communication apparatus of the present invention is applied to the digital camera 2. However, the wireless LAN communication apparatus of the present invention can be applied to a terminal such as a mobile phone with built in camera and a PDA.

Figure 11:
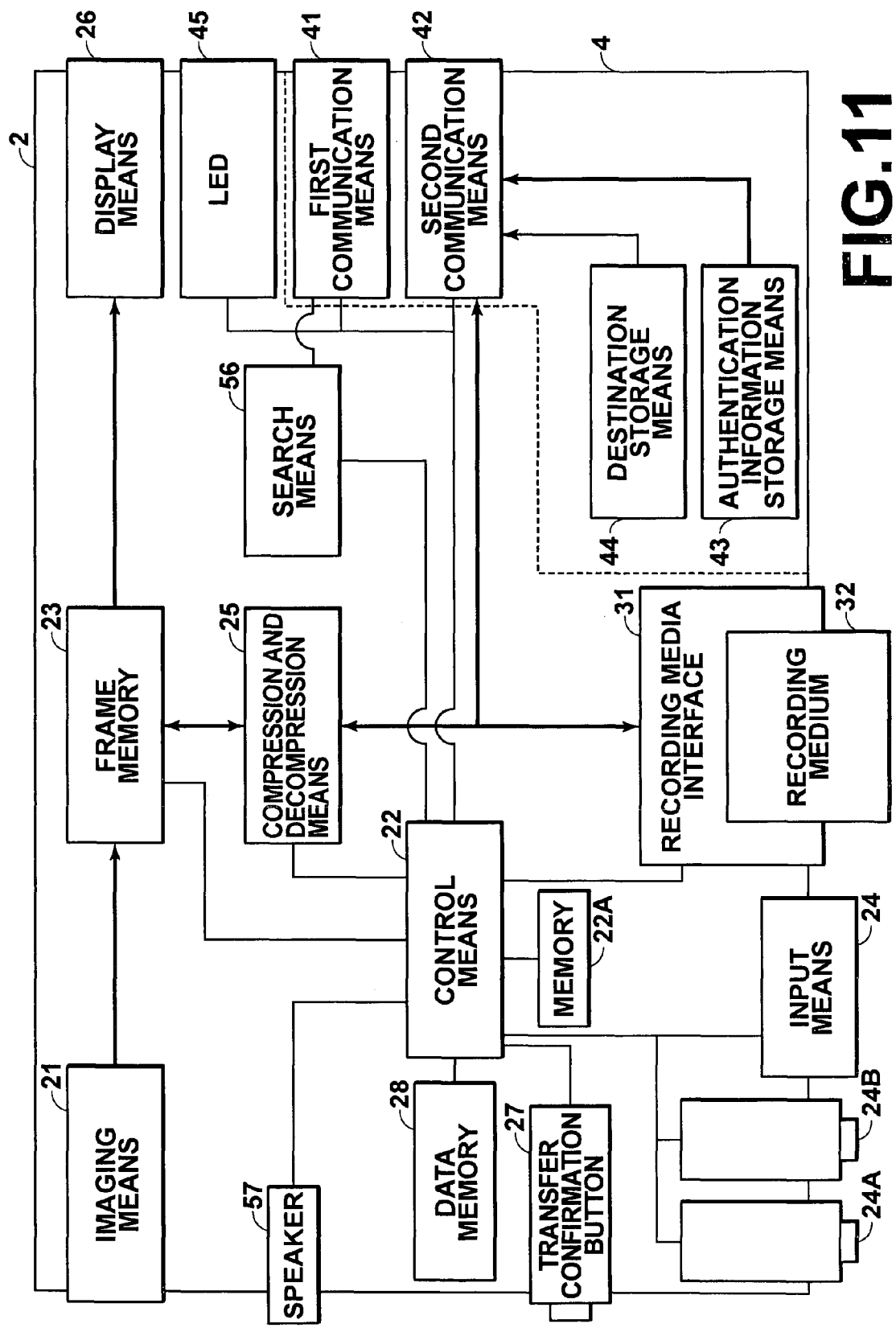
FIG. 11 is a block diagram showing a configuration of a digital camera adopting an imaging apparatus of a fourth embodiment of the present invention.

A fourth embodiment of the present invention will be explained next. FIG. 11 is a block diagram showing a configuration of a digital camera adopting an imaging apparatus of the fourth embodiment of the present invention. In the fourth embodiment, the same elements as in the first embodiment have the same reference numbers, and detailed explanations thereof will be omitted. In the fourth embodiment, the digital camera 2 comprises search means 56, instead of the judgment means 46, for searching for the wireless LAN communication equipment that is communicable with the digital camera 2 and a speaker 57 for outputting various kinds of sounds.

The first communication means 41 in the fourth embodiment is activated by the control means 22 in the case where the mobile phone position information acquisition button 24B is pressed, and carries out the search of the base station that is communicable with the first communication means 41 in the mobile phone communication network. The first communication means 41 receives the base station information B0 from the base station found as a result of the search, and inputs the base station information B0 to the search means 56. The base station information B0 is used for searching for the wireless LAN communication equipment that is communicable with the second communication means 42, as will be explained later. In the case where all the selected image data sets S1 that were stored in the data storage 28 have been sent, the base station search by the first communication means 41 is stopped.

In the fourth embodiment, if the wireless search button 24A is pressed, the control means 22 turns on the LED 45 to emit blue light in the case where the second communication means 42 is within the coverage area of the wireless LAN communication equipment. In the case where the second communication means 42 is not within the coverage area, the LED 45 is turned off. In the case where communication with the wireless LAN communication equipment is unstable, the control means 22 causes the LED 45 to flash.

The search means 56 searches for the wireless LAN communication equipment that is communicable with the second communication means 42 via the wireless within the coverage area of the base station from which the base station information B0 was obtained, based on the base station information B0 input from the first communication means 41. More specifically, the search means 56 has a database of the information B0 on the base stations whose coverage areas include the locations of the wireless LAN communication equipment that to be communicable with the second communication means 42 via the wireless LAN. When the base station information B0 is received from the first communication means 41, the search means 56 refers to the database and searches for the wireless LAN communication equipment that is communicable with the second communication means 42. The database includes the names of the wireless service providers that installed the wireless LAN communication equipment.

The first communication means 41 may receive the base station information B0 from the plurality of base stations. In this case, the search means 56 carries out the search by using the base station information B0 sent from one of the base stations having the strongest field intensity.

The search means 56 displays a result of the search for the wireless LAN communication equipment as a list on the display means 26. In the case where the number of the pieces of the wireless LAN communication equipment that are communicable with the second communication means 42 is one, only the piece of the wireless LAN communication equipment is displayed on the display means 26. In the case where the number of the pieces is not one, the search means 56 temporarily activates the second communication means 42 to cause the second communication means 42 to measure the field intensity regarding all the pieces. The pieces of the wireless LAN communication equipment are displayed in order of stronger field intensity, as the list on the display means 26.

Figure 12A:
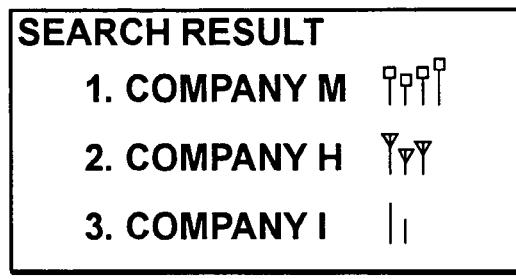
FIGS. 12(*a*) and 12(*b*) show examples of a list of a search result (part 1)

FIG. 12(a) shows how the wireless LAN communication equipment is displayed as the list. As shown in FIG. 12(a), the list displays the result of the search for the wireless LAN communication equipment, and three pieces of the wireless LAN communication equipment are displayed as the wireless LAN communication equipment that is communicable with the second communication means 42. The list includes the names of the wireless service providers of the wireless LAN communication equipment. In the list are displayed Company M having the strongest field intensity, Company H having the second-strongest field intensity, and Company I having the weakest field intensity. Symbols resembling antennas are displayed for representing the field intensity, on the right of each of the company names. The more the number of the antennas is, the stronger the field intensity is. Symbols of antennas having inverted triangles represent the wireless service provider of the user. Symbols of antennas having squares represent the wireless service provider providing the roaming service to the wireless service provider of the user. Symbols of antennas having simple lines represent another wireless service provider.

The name of the wireless service provider of the user may be displayed in blue while the name of the wireless service provider providing the roaming service may be displayed in red. The name of the wireless service provider other than those is displayed in black. The name of the wireless service provider having the strongest field intensity may flash.

Figure 12B:
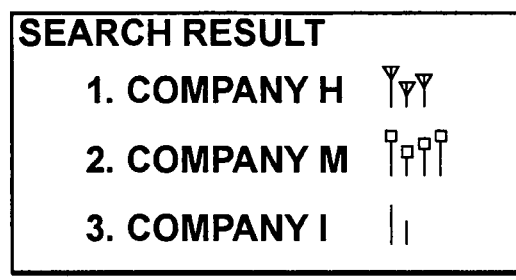

The search means 56 may be set so as to display the wireless service provider of the user in priority over the others. In this case, company H is shown first in the list on the display means 26, as shown in FIG. 12(*b*), while company M comes second in the list.

Figure 13:
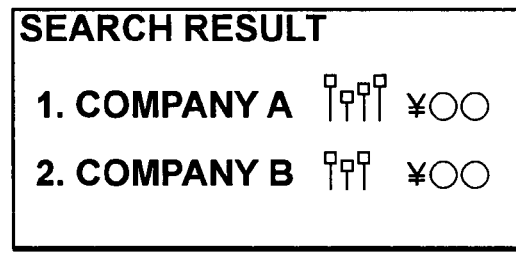
FIG. 13 shows the list of the search result (part 2)

For the wireless service provider providing the roaming service, the database of the search means 56 may include information on a communication charge therefor so that the charge can also be displayed in the list, as shown in FIG. 13. By displaying the charge in this manner, the communication charge can be used as a criterion for selecting the wireless LAN communication equipment via which the selected image data sets S1 are sent, in the case where the wireless LAN communication equipment of the wireless service provider of the user is not found but the wireless LAN communication equipment of the wireless service provider providing the roaming service is found.

Figure 14:
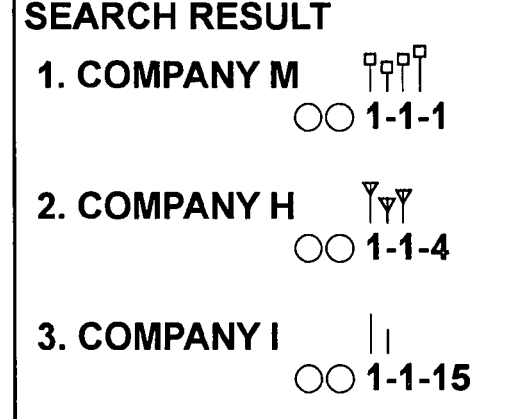
FIG. 14 shows the list of the search result (part 3)

The database of the search means 56 may include information on the addresses of the wireless LAN communication equipment so that the addresses can also be shown in the list, as shown in FIG. 14. By displaying the addresses in the above manner, the user can easily move to the location of the wireless LAN communication equipment of his/her preference, and can carry out data communication in a more preferable communication state.

The user selects a desired one of the wireless service providers displayed in the list by using the input means 24. By pressing the wireless search button 24A thereafter, the selection result is input to the control means 22, and the second communication means 42 is activated. In this manner, data communication is started with the wireless LAN communication equipment installed by the service provider that has been selected. In the case where all of the selected image data sets S1 that were stored in the data memory 28 have been sent, the control means 22 stops the operation of the second communication means 42.

Figure 15:
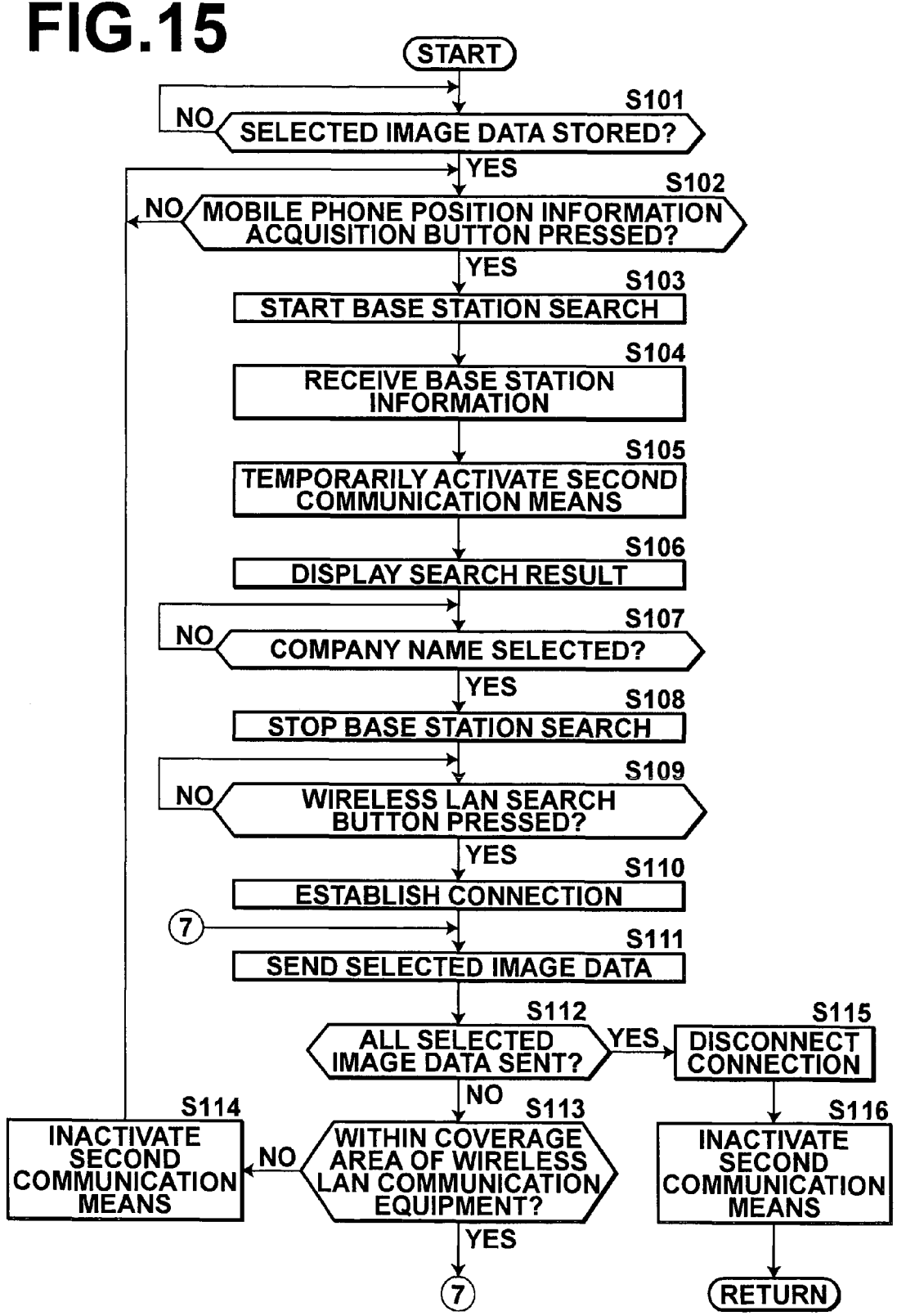
FIG. 15 is a flow chart showing procedures carried out at the time of sending selected image data in the fourth embodiment.

The operation of the fourth embodiment will be explained next. Procedures carried out at the time of sending the selected image data sets S1 from the digital camera 2 will only be explained. FIG. 15 is a flow chart showing the procedures. In this example, the user of the digital camera 2 is assumed to send the selected image data sets S1 to the wireless LAN communication equipment 13A~13C installed by the wireless service provider that runs the network printing system 1. At the time of sending the selected image data sets S1, the same procedures are carried out in the broadband town 1A, in the broadband hot spot 1B, or in the broadband satellite 1C. Therefore, the procedures carried out at the time of sending the selected image data sets S1 from the digital camera 2 to the broadband town 1A will be explained.

The control means 22 is monitoring whether or not the selected image data sets S1 are stored in the data memory 28 (Step S101). If a result at Step S1 is affirmative, whether or not the mobile phone position information acquisition button 24B has been pressed is judged (Step S102). If a result of the judgment at Step S102 is affirmative, the first communication means 41 carried out the base station search via the mobile phone communication network (Step S103). The base station information B0 sent from the communicable base station is received by the first communication means 41 (Step S104). The second communication means 42 is temporarily activated (Step S105), and the base station information B0 is input to the search means 56. The search means 56 refers to the database, and the list is displayed on the display means 26 for representing the names of the wireless service providers who installed the wireless LAN communication equipment that is communicable with the second communication means 42 (Step S106). The operation of the second communication means 42 is stopped after display of the list. Alternatively, the second communication means 42 may stay activated.

In the case where the selected image data sets S1 are stored in the data memory 28, the LED 45 is turned on to emit orange light by an instruction of data confirmation input from the user with use of the input means 24. Therefore, the user can visually confirm storage of the selected image data sets S in the data memory 28.

Whether or not the user has selected the name of a desired one of the wireless service providers from the list is judged (Step S107). If a result at Step S107 is affirmative, the base station search by the first communication means 41 is stopped (Step S108), and whether or not the wireless search button 24A has been pressed is then judged (Step S109). If a result at Step S109 is affirmative, the second communication means 42 is activated and the connection is established via the wireless (step S110) between the second communication means 42 and the wireless LAN communication equipment installed by the wireless service provider selected by the user (in this case, the wireless LAN communication equipment 13A).

When the base station search is stopped, the first communication means 41 is also inactivated. At this time, by pressing the wireless search button 24A, the LED 45 is turned on to emit blue light. In the case where the connection is unstable, the LED 45 flashes. Therefore, the user can visually confirm the communication state with the wireless LAN communication equipment 13A. A sound made by beeping or the like may be output from the speaker 57 for representing the communication state.

In this state, the selected image data sets S1 are sent from the digital camera 2 to the wireless LAN communication equipment 13A (Step S111). More specifically, the control means 22 reads the authentication information N stored in the authentication information storage means 43, and sends the authentication information N to the wireless LAN communication equipment 13A via the second communication means 42. In the case where the digital camera 2 has been authenticated, the order information C and the selected image data sets S1 stored in the data memory 28 are sent to the wireless LAN communication equipment 13A. The selected image data sets S1 and the order information C are sent to and stored in the image server 11A of the DPE store 14 where the prints P are generated according to the order information C.

Whether all the selected image data sets S1 have been sent or not is then judged (Step 112). If a result at Step S112 is negative, whether or not the second communication means 42 is within the coverage area of the wireless LAN communication equipment 13A is judged, in consideration of a possibility of the user being on the move (Step S113). If a result at Step S113 is affirmative, the process returns to Step S111, and transmission of the selected image data sets S1 is continued.

If the result at Step S113 is negative, the second communication means 42 is inactivated (Step S114), and the process goes back to Step S112. Whether or not the mobile phone position information acquisition button 24B has been pressed is then judged.

If the result at Step S112 is affirmative, the connection between the second communication means 42 and the wireless LAN communication equipment 13A is disconnected (Step S115), and the second communication means 42 is inactivated (Step S116). The process goes back to Step S111.

In the fourth embodiment, procedures carried out in the broadband town 1A and in the broadband satellite 1C after reception of the selected image data sets S1 are the same as in the first embodiment.

As has been described above, in the fourth embodiment, when the mobile phone position information acquisition button 24B is pressed, the first communication means 41 receives the base station information B0 from the communicable base station in the mobile phone communication network, and the wireless LAN communication equipment that is communicable with the second communication means 42 is searched for. The result of the search is displayed as the list on the display means 26. Therefore, power consumption caused by continuous operation of the second communication means 42 can be avoided, and the communicable wireless LAN communication equipment can be searched for with comparatively low power consumption.

Since the selected image data sets S1 are sent after the wireless search button 24A is pressed, the selected image data sets S1 are not sent unless the user presses the wireless search button 24A. Therefore, the selected image data sets S1 can be sent by the second communication means 42 only in the case where the user intends to do so. Consequently, the second communication means 42 does not need to be operating continuously. In this manner, the power consumption by the second communication means 42 can be reduced.

Figure 16:
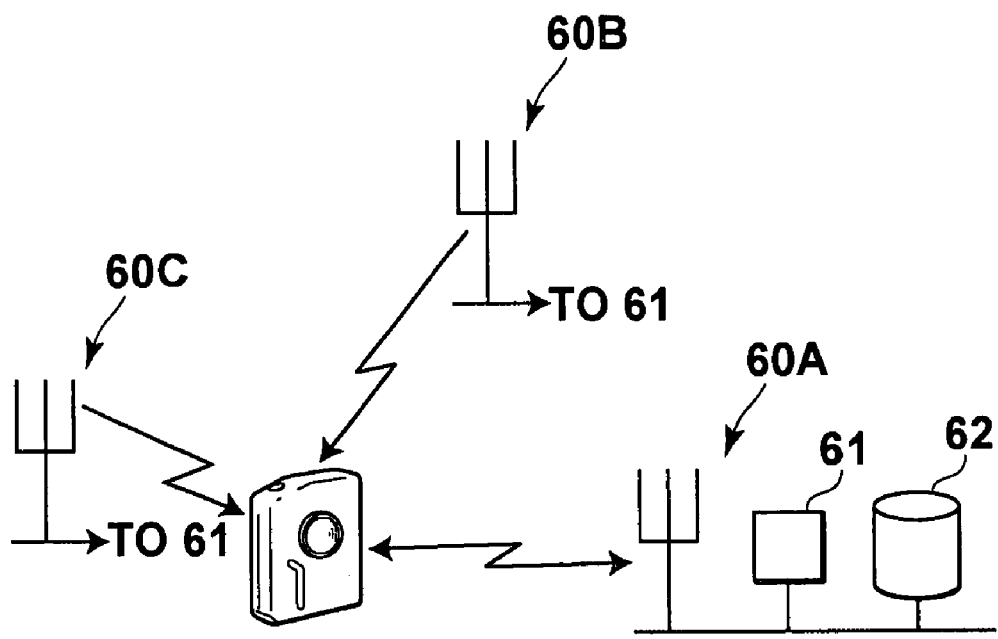
FIG. 16 is a diagram showing how a position of the digital camera is detected with use of a mobile phone communication network.

In the fourth embodiment, the position of the digital camera 2 may be detected accurately based on distances from three base stations 60A, 60B, and 60C, as shown in FIG. 16. Hereinafter, this position detection will be explained in detail. Each of the base stations 60A, 60B, and 60C sends a positioning signal to the digital camera 2, and measures the time (round trip time) necessary for the positioning signal to return thereto. The base station 60A is used as a main base station, and comprises a position detection server 61 for detecting the position of the digital camera 2 and storage means 62 for storing a database having information of the coverage areas of the wireless LAN communication equipment.

The control means 22 controls the first communication means 41 so that the positioning signal is returned to the base stations 60A, 60B, and 60C only in the case where the mobile phone position information acquisition button 24B is pressed.

The base stations 60A, 60B, and 60C measure the time that was necessary for the positioning signal to make a round trip to the digital camera 2. The base stations 60B and 60C send the measured time to the base station 60A.

The position detection server 61 calculates the distances between the base stations 60A, 60B, and 60C and the digital camera 2 by using the measured time, and detects the position of the digital camera 2 based on the distances. The position detection server 61 then refers to the database stored in the storage means 62, and obtains the information on the wireless LAN communication equipment that is communicable with the second communication means 42 in the current position of the digital camera 2. The information is sent to the digital camera 2. The digital camera 2 displays on the display means 26 the list of the search result regarding the communicable wireless LAN communication equipment, based on the information on the wireless LAN communication equipment received from the position detection server 61. Thereafter, the user selects the desired piece of the wireless LAN communication equipment from the list, and the selected image data sets S1 are sent to the selected piece of the wireless LAN communication equipment as in the embodiments described above.

Figure 17:
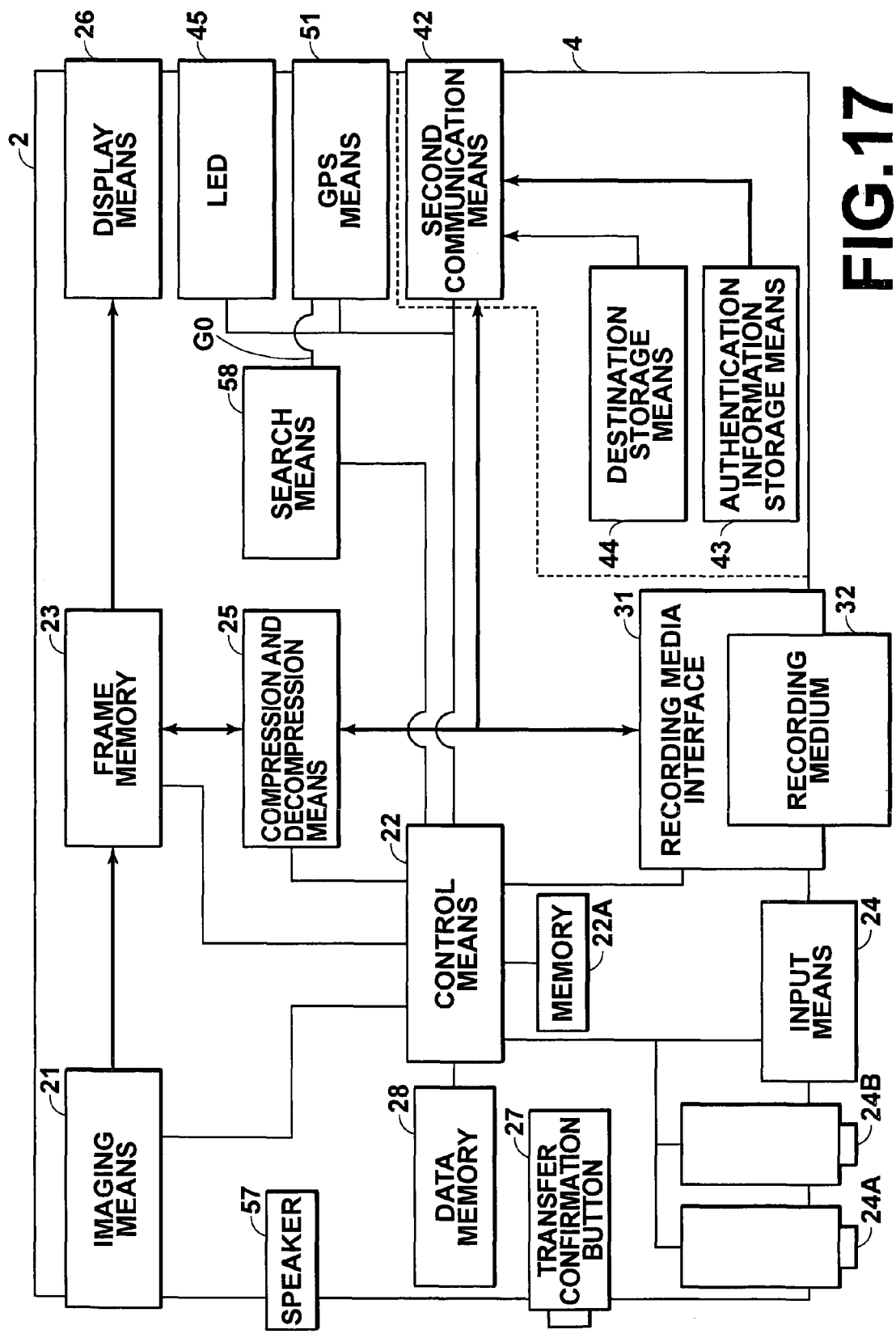
FIG. 17 is a block diagram showing a configuration of a digital camera adopting an imaging apparatus of a fifth embodiment of the present invention.

A fifth embodiment of the present invention will be explained next. FIG. 17 is a block diagram showing a configuration of a digital camera adopting an imaging apparatus of the fifth embodiment of the present invention. In the fifth embodiment, the same elements as in the fourth embodiment have the same reference numbers, and detailed explanations thereof will be omitted. In the fifth embodiment, instead of the first communication means 41, the search means 56, and the mobile phone position information acquisition button 24B, the digital camera 2 comprises GPS means 51 for receiving GPS information G0 from GPS satellites, search means 58 for judging whether or not the digital camera 2 is within one of the coverage areas of the wireless LAN communication equipment based on the GPS information G0, and a GPS button 24C for activating the GPS means 51. In the fifth embodiment, the second communication means 42, the authentication information storage means 43, and the destination storage means 44 are installed in a chip 4.

The GPS means 51 starts acquisition of the GPS information G0 from the GPS satellites when the GPS button 24C is pressed.

The search means 58 searches for the communicable wireless LAN communication equipment in the current position of the digital camera 2, based on the GPS information G0 input from the GPS means 51. More specifically, the search means 58 has a database of latitude and longitude information for specifying the coverage areas of the wireless LAN communication equipment, and refers to the database when the GPS information G0 is input from the GPS means 51, for searching for the pieces of the wireless LAN communication equipment that are communicable with the second communication means 42. In the case where the communicable wireless LAN communication equipment exists, the second communication means 42 measures the field intensity, as in the fourth embodiment, and a result of the search is displayed on the display means 26 as a list, according to the measured intensity.

When the user selects a desired one of the wireless service providers and presses the wireless search button 24A, information representing the actions by the user is input to the control means 22, and data communication between the second communication means 42 and the wireless LAN communication equipment of the selected wireless service provider starts. The selected image data sets S1 stored in the data memory 28 are then sent to the wireless LAN communication equipment. After all the image data sets S1 that were stored in the data memory 28 have been sent, the control means 22 stops the operation of the second communication means 42.

Figure 18:
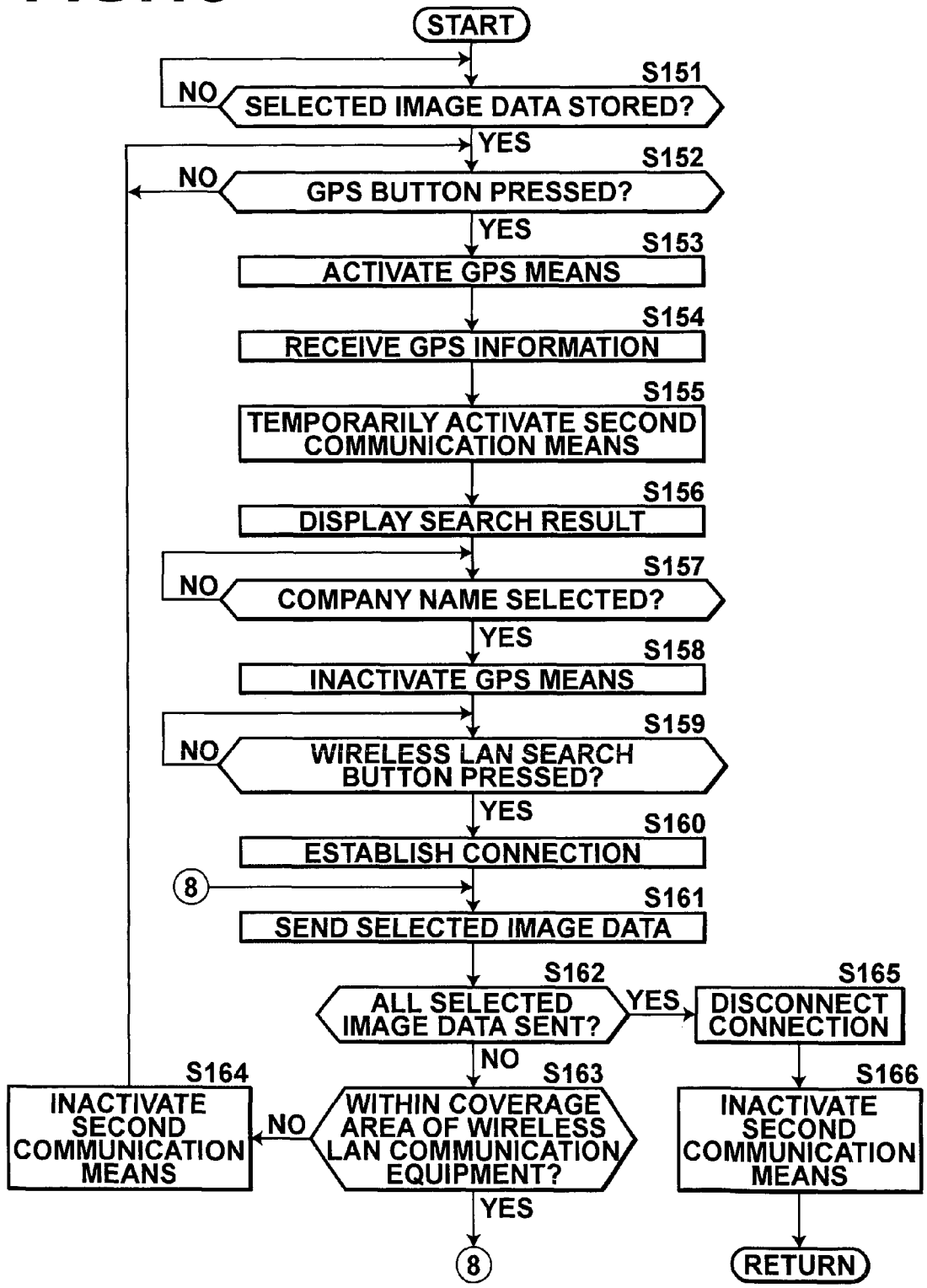
FIG. 18 is a flow chart showing procedures carried out at the time of sending selected image data in the fifth embodiment.

The operation of the fifth embodiment will be explained next. Procedures carried out at the time of sending the selected image data sets S1 from the digital camera 2 will only be explained. FIG. 18 is a flow chart showing the procedures.

The control means 22 is monitoring whether or not the selected image data sets S1 are stored in the data memory 28 (Step S151). If a result at Step S151 is affirmative, whether or not the GPS button 24C has been pressed is judged (Step S152). If a result at Step s152 is affirmative, the GPS means 51 is activated (Step S153). The GPS information G0 is then received from the GPS satellites (Step S154). The second communication means 42 is temporarily activated (Step S155), and the GPS information G0 is input to the search means 58. The search means 58 refers to the database, and the list is displayed on the display means 26 for representing the names of the wireless service providers who installed the wireless LAN communication equipment that is communicable with the second communication means 42 (Step S156). The operation of the second communication means 42 is stopped after display of the list. Alternatively, the second communication means 42 may stay activated.

Whether or not the user has selected the name of the desired one of the wireless service providers from the list is judged (Step S157). If a result at Step S157 is affirmative, the acquisition of the GPS information G0 by the GPS means 51 is stopped (Step S158), and whether or not the wireless search button 24A has been pressed is then judged (Step S159). If a result at Step S159 is affirmative, the second communication means 42 is activated and the connection is established between the second communication means 42 and the wireless LAN communication equipment installed by the wireless service provider selected by the user (in this case, the wireless LAN communication equipment 13A as in the first embodiment) via the wireless (Step S160).

In this state, the selected image data sets S1 are sent from the digital camera 2 to the wireless LAN communication equipment 13A (Step S161).

Whether all the selected image data sets S1 have been sent or not is judged (Step 162). If the result at Step S162 is negative, whether or not the second communication means 42 is within the coverage area of the wireless LAN communication equipment 13A is judged, in consideration of a possibility of the user being on the move (Step S163). If a result at Step S163 is affirmative, the process returns to Step S161 and transmission of the selected image data sets S1 is continued. If the result at Step S163 is negative, the second communication means 42 is inactivated (Step S164), and the process goes back to Step S152. Whether or not the GPS button 24C has been pressed is then judged.

If the result at Step S162 is affirmative, the connection between the second communication means 42 and the wireless LAN communication equipment 13A is disconnected (Step S165), and the second communication means 42 is inactivated (Step S166). The process goes back to Step S151.

In the fourth and fifth embodiments described above, the wireless LAN communication equipment that is communicable with the second communication means 42 is searched for, if the user presses the mobile phone position information acquisition button 24B or the GPS button 24C. However, in some cases, the user clearly knows the fact that digital camera 2 is in one of the coverage areas of the wireless LAN communication equipment installed by his/her wireless service provider. In this case, communication is carried out between the second communication means 42 and the wireless LAN communication equipment of his/her wireless service provider if the user only presses the wireless search button 24A. The selected image data sets S1 stored in the data memory 28 are then sent to the wireless LAN communication equipment.

In the fourth and fifth embodiments, the imaging apparatus of the present invention is applied to the digital camera 2. However, the imaging apparatus of the present invention may be applied to a terminal such as a digital camcorder, a mobile phone with built in camera, or a PDA having a communication function.

What is claimed is:

1. A wireless communication apparatus comprising:
    a wireless communication means comprising a first communication means for communicating with a plurality of base stations and a second communication means for communicating via a wireless local area network (LAN) with wireless LAN communication equipment, for carrying out data communication with wireless communication equipment;
    a judgment means comprising a database of information on a plurality of base stations whose coverage areas include a location of the wireless LAN communication equipment to be communicable with the second communication means, and, when the base station information is received from the first communication means, the judgment means refers to the database and judges whether or not the second communication means is within the coverage area of the wireless LAN communication equipment; and
    an operation control means for automatically activating the wireless communication means only in the case where a result of the judgment by the judgment means is affirmative.

2. The wireless communication apparatus according to claim 1, further comprising lighting means whose state of lighting changes in accordance with a communication state between the wireless communication means and the wireless LAN communication equipment.

3. The wireless communication apparatus according to claim 1, the judgment means further comprising:
    mobile phone communication means for carrying out data communication via a mobile phone communication network, wherein
    the mobile phone communication means receives base station information from the first communication means representing a base station of the mobile phone communication network that carries out the data communication with the mobile phone communication means and the judgment means judges whether or not the wireless communication means is within the coverage area of the wireless LAN communication equipment by judging whether or not the base station represented by the base station information has a coverage area including the coverage area of the wireless LAN communication equipment.

4. The wireless communication apparatus according to claim 1, the judgment means further comprising:
    mobile phone communication means for carrying out data communication via a mobile phone communication network, wherein
    the mobile phone communication means receives base station information form the first communication means representing a base station of the mobile phone communication network that carries out the data communication with the mobile phone communication means, and the judgment means judges whether or not the wireless communication means is within the coverage area of the wireless LAN communication equipment by judging whether or not the base station represented by the base station information has a coverage area including the coverage area of the wireless communication equipment of a specific characteristic.

5. The wireless communication apparatus according to claim 1, the judgment means further comprising:
    GPS reception means for receiving GPS information from GPS satellites, wherein
    the judgment means judges whether or not the wireless communication means is within the coverage area of the wireless LAN communication equipment, based on the GPS information.

6. The wireless communication apparatus according to claim 1, the judgment means further comprising:
GPS reception means for receiving GPS information from GPS satellites, wherein
the judgment means judges whether or not the wireless communication means is within the coverage area of the wireless LAN communication equipment of a specific characteristic, based on the GPS information.

7. An imaging apparatus comprising:
the wireless communication apparatus according to claim 1;
image capturing means for obtaining image data;
authentication information storage means for storing authentication information that is necessary for the data communication with the wireless LAN communication equipment via a wireless network;
image storage means for storing the image data obtained by the image capturing means; and
control means for causing the judgment means to judge whether or not the wireless communication means is within the coverage area of the wireless LAN communication equipment in the case where the image data are stored in the image storage means, and for controlling the wireless communication means so as to send the authentication information stored in the authentication information storage means to the wireless LAN communication equipment by carrying out the data communication with the wireless communication equipment when the operation control means activates the wireless communication means, and so as to send the image data in the image storage means to the wireless LAN communication equipment after the wireless LAN communication equipment authenticates the imaging apparatus according to the authentication information.

8. The imaging apparatus according to claim 7, wherein the control is also means for prohibiting roaming in the case where the wireless communication means has been moved to a coverage area of other wireless LAN communication equipment that is not authenticated by the authentication information but enables roaming with the wireless LAN communication equipment that is authenticated by the authentication information, during the data communication with the wireless LAN communication equipment that is authenticated.

9. The imaging apparatus according to claim 7, wherein the operation control means inactivates the wireless communication means after the image data that were stored in the image storage means have been sent.

10. The wireless communication apparatus according to claim 1, wherein the wireless LAN communication equipment is connected to an image server, which stores the data communicated to the wireless LAN communication equipment for image processing.

11. An imaging apparatus comprising;
image capturing means for obtaining image data;
wireless communication means comprising a first communication means for communicating with a plurality of base stations and a second communication means for communicating via a wireless local area network (LAN) with wireless LAN communication equipment, for carrying out data communication with the wireless LAN communication equipment via the wireless LAN;
authentication information storage means for storing authentication information that is necessary for the data communication with the wireless LAN communication equipment via the wireless LAN;
image storage means for storing the image data obtained by the imaging means;
instruction means for receiving a transfer instruction regarding the image data stored in the image storage means;
control means for automatically controlling the wireless communication means so as to send the authentication information stored in the authentication information storage means to the wireless LAN communication equipment by carrying out the data communication with the wireless LAN communication equipment in the case where the transfer instruction is received by the instruction means in a state where the image data are stored in the image storage means, and so as to send the image data stored in the image storage means to the wireless LAN communication equipment after the wireless LAN communication equipment authenticates the imaging apparatus according to the authentication information;
search means for carrying out a search for pieces of the wireless LAN communication equipment that are communicable with the wireless communication means, in response to an external instruction input;
display means for displaying a list of the pieces of the wireless LAN communication equipment as a result of the search carried out by the search means; and
selection means for receiving selection of a desired one of the pieces of the wireless LAN communication equipment from the result of the search, wherein
the control means controls the wireless communication means so as to send the authentication information stored in the authentication information storage means to the selected piece of the wireless LAN communication equipment by carrying out the data communication with the selected piece of the wireless LAN communication equipment in the case where the desired piece of the wireless LAN communication equipment has been selected from the search result and the transfer instruction is received by the instruction means in a state where the image data are stored in the image storage means, and so as to send the image data stored in the image storage means to the selected piece of the wireless LAN communication equipment after the selected piece of the wireless LAN communication equipment authenticates the imaging apparatus according to the authentication information.

12. The imaging apparatus according to claim 11, wherein the search means searches for pieces of wireless LAN communication equipment including wireless LAN communication equipment that enables roaming with the wireless LAN communication equipment authenticated by the authentication information, in addition the wireless LAN communication equipment authenticated by the authentication information, and wherein
the display means displays the types of a plurality of pieces of wireless LAN communication equipment in the case where the wireless communication means is communicable with the plurality of pieces of wireless LAN communication equipment including the wireless LAN communication equipment authenticated by the authentication information and/or the pieces of wireless LAN communication equipment searched for by the search means.

13. The imaging apparatus according to claim 12, wherein the display means displays a communication charge for the pieces of wireless LAN communication equipment searched for by the search means.

14. The imaging apparatus according to claim 11, the search means further comprising mobile phone communication means for carrying out data communication via a mobile phone communication network, wherein the mobile phone communication means receives base station information from the first communication means representing a base station of the mobile phone communication network via which the data communication with the mobile phone communication means is carried out, and the search means searches for the pieces of the wireless LAN communication equipment that are communicable with the wireless communication means, based on the base station information.

15. The imaging apparatus according to claim 11, the search means further comprising GPS reception means for receiving GPS information from GPS satellites, wherein the search mean searches for the pieces of the wireless LAN communication equipment that are communicable with the wireless communication means, based on the GPS information.

16. A method for data communication between a wireless "LAN" communication apparatus and a wireless LAN communication equipment, comprising:

selecting image data sets to be transferred from the wireless communication apparatus to the wireless communication equipment;

searching for at least one wireless LAN communication equipment within a wireless communication network for establishing communication with the wireless LAN communication equipment through the wireless communication network;

receiving wireless LAN communication equipment information regarding communicable wireless LAN communication equipment located in the wireless communication network;

judging whether or not the wireless communication apparatus is within a coverage area of the wireless LAN communication equipment; and automatically establishing a connection between the wireless communication apparatus and the wireless LAN communication equipment when the wireless communication apparatus is judged to be within the coverage of the wireless LAN communication equipment.

17. The method of claim 16, further comprising:

repeating searching for a wireless LAN communication equipment when the wireless communication apparatus is judged to not be within the coverage of the wireless LAN communication equipment.

18. The method of claim 16, further comprising:

sending the selected data to the wireless communication apparatus.

19. The method of claim 16, wherein the searching for a wireless LAN communication equipment within a wireless communication network is performed by activating a GPS searching means; and the receiving wireless LAN communication equipment information regarding communicable wireless LAN communication equipment located in the wireless communication network comprises receiving GPS information of the wireless LAN communication equipment.

20. The method of claim 19, the receiving base station information regarding communicable wireless LAN communication equipment located in the wireless communication network further comprises company name information.

21. The method of claim 16, wherein the receiving base station information regarding communicable wireless LAN communication equipment located in the wireless communication network comprises receiving wireless LAN communication equipment information from multiple wireless LAN communication equipment, and the judging whether or not the wireless communication apparatus is within a coverage area of the wireless LAN communication equipment makes the judgment by using the wireless LAN communication equipment information that has the strongest field intensity.

22. The method of claim 16, wherein the receiving base station information regarding communicable wireless LAN communication equipment located in the wireless communication network comprises company name information.

23. The wireless communication apparatus according to claim 16, wherein the wireless communication equipment is connected to an image server, which stores the data communicated to the wireless communication equipment for image processing.

* * * * *